(12) United States Patent
Ueyama et al.

(10) Patent No.: US 11,805,212 B2
(45) Date of Patent: Oct. 31, 2023

(54) MULTIFUNCTION APPARATUS AND CONTROL METHOD FOR MULTIFUNCTION APPARATUS

(71) Applicant: SEIKO EPSON CORPORATION, Tokyo (JP)

(72) Inventors: Naohiro Ueyama, Matsumoto (JP); Yasumichi Okuda, Matsumoto (JP); Masako Miyahara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/062,657

(22) Filed: Dec. 7, 2022

(65) Prior Publication Data

US 2023/0188657 A1 Jun. 15, 2023

(30) Foreign Application Priority Data

Dec. 9, 2021 (JP) .................................. 2021-199874

(51) Int. Cl.
*H04N 1/00* (2006.01)
*H04N 1/23* (2006.01)

(52) U.S. Cl.
CPC ....... *H04N 1/00649* (2013.01); *H04N 1/0096* (2013.01); *H04N 1/00602* (2013.01);
(Continued)

(58) Field of Classification Search
CPC .. G09G 5/00; H04N 21/4312; H04N 21/4622; H04N 21/47; H04N 21/475; H04N 21/482; H04N 21/84; A63F 13/211; A63F 13/219; A63F 13/57; A63F 13/69; A63F 2300/1006; A63F 2300/105;
(Continued)

(56) References Cited

U.S. PATENT DOCUMENTS 7,443,406 B2 * 10/2008 Mohri ................ G03G 15/0194
347/115
2011/0002013 A1 * 1/2011 Kido ...................... H04N 1/047
358/401
(Continued)

FOREIGN PATENT DOCUMENTS

JP 2021-29002 A 2/2021

*Primary Examiner* — Negussie Worku
(74) *Attorney, Agent, or Firm* — WORKMAN NYDEGGER

(57) ABSTRACT

A multifunction apparatus includes a reading mechanism including a document discharge port configured to discharge a document, a recording mechanism including a medium discharge port configured to discharge a recording medium, and a control unit, and a path through which a leading end of the recording medium discharged from the medium discharge port passes and the document discharged from the document discharge port have such a positional relationship to intersect with each other at an intersecting position, and when the leading end of the recording medium is discharged from the medium discharge port in a stop state where the document discharged from the document discharge port blocks the path of the leading end of the recording medium discharged from the medium discharge port, the control unit performs a predetermined operation for canceling the stop state before causing the leading end of the recording medium to reach the intersecting position.

7 Claims, 22 Drawing Sheets

(52) U.S. Cl.
CPC ..... *H04N 1/00631* (2013.01); *H04N 1/00795* (2013.01); *H04N 1/23* (2013.01); *H04N 2201/0094* (2013.01)

(58) Field of Classification Search
CPC ......... A63F 2300/1087; A63F 2300/64; G06F 3/00; G06F 3/0325; G06F 3/0346; G06F 3/0383; G06F 3/042; G06F 3/14
USPC .......................................................... 358/401
See application file for complete search history.

(56) References Cited

U.S. PATENT DOCUMENTS

| | | | |
|---|---|---|---|
| 2015/0097333 A1* | 4/2015 | Kimura | B65H 7/20 271/227 |
| 2015/0293484 A1* | 10/2015 | Kawasaki | B65H 23/032 399/384 |
| 2015/0319324 A1* | 11/2015 | Kanaya | H04N 1/00689 358/437 |
| 2016/0185133 A1* | 6/2016 | Asada | B41J 11/0045 347/104 |
| 2021/0044712 A1 | 8/2021 | Ueyama et al. | |
| 2022/0055380 A1* | 2/2022 | Katagami | B41J 11/02 |

\* cited by examiner

MULTIFUNCTION APPARATUS AND CONTROL METHOD FOR MULTIFUNCTION APPARATUS

The present application is based on, and claims priority from JP Application Serial Number 2021-199874, filed Dec. 9, 2021, the disclosure of which is hereby incorporated by reference herein in its entirety.

BACKGROUND

1. Technical Field

The present disclosure relates to a multifunction apparatus and a control method for a multifunction apparatus.

2. Related Art

Typically, as described in JP-A-2021-29002, a document reading apparatus having a reading function for reading an image of a document and a printing function for printing an image on a printing medium is known. The document reading apparatus includes a discharge port for reading from which a read document is discharged, and a discharge port for printing from which a printed printing medium is discharged, and the discharge port for reading is disposed upward in a vertical direction of the discharge port for printing.

In the document reading apparatus described in JP-A-2021-29002, the rear end of a document read in the discharge port for reading is held, and in a state where the document is held, the printing function is in a stop state. Note that, in the state where the document is held, the discharge port for printing is occluded by the document hanging down from the discharge port for reading.

Here, with the configuration in which the reading function and the printing function are simultaneously performed, when a printing medium is discharged in the state in which the rear end of the document is held, there is a problem that the leading end of the printing medium collides with the document and a discharging operation of the printing medium is inhibited by the document, and thus, transporting jam occurs.

SUMMARY

A multifunction apparatus includes a reading mechanism including a reading unit configured to read information of a document, and a document discharge port configured to discharge the read document, a recording mechanism including a recording unit configured to record the information on a recording medium, and a medium discharge port configured to discharge the recording medium on which recording was performed, and a control unit, the document discharge port is disposed upward in a vertical direction of the medium discharge port, and a path through which a leading end of the recording medium discharged from the medium discharge port passes and the document discharged from the document discharge port have such a positional relationship to intersect with each other at an intersecting position, the reading of the document by the reading mechanism and the recording on the recording medium by the recording mechanism are configured to be simultaneously performed, and when the leading end of the recording medium is discharged from the medium discharge port in a stop state where the discharging of the document is stopped at a position where the document discharged from the document discharge port blocks the path of the leading end of the recording medium discharged from the medium discharge port, the control unit performs a predetermined operation for canceling the stop state before causing the leading end of the recording medium to reach the intersecting position.

A control method for a multifunction apparatus, the multifunction apparatus including a reading mechanism including a reading unit configured to read information of a document, and a document discharge port configured to discharge the read document, a recording mechanism including a recording unit configured to record the information on a recording medium, and a medium discharge port configured to discharge the recording medium on which recording was performed, and a control unit, wherein the document discharge port is disposed upward in a vertical direction of the medium discharge port, and a path through which a leading end of the recording medium discharged from the medium discharge port passes and the document discharged from the document discharge port have such a positional relationship to intersect with each other at an intersecting position, and the reading of the document by the reading mechanism and the recording on the recording medium by the recording mechanism are configured to be simultaneously performed, includes, when the leading end of the recording medium is discharged from the medium discharge port in a stop state where the discharging of the document is stopped at a position where the document discharged from the document discharge port blocks the path of the leading end of the recording medium discharged from the medium discharge port, performing a predetermined operation for canceling the stop state before causing the leading end of the recording medium to reach the intersecting position.

DESCRIPTION OF EXEMPLARY EMBODIMENTS

1. First Embodiment

Figure 1:
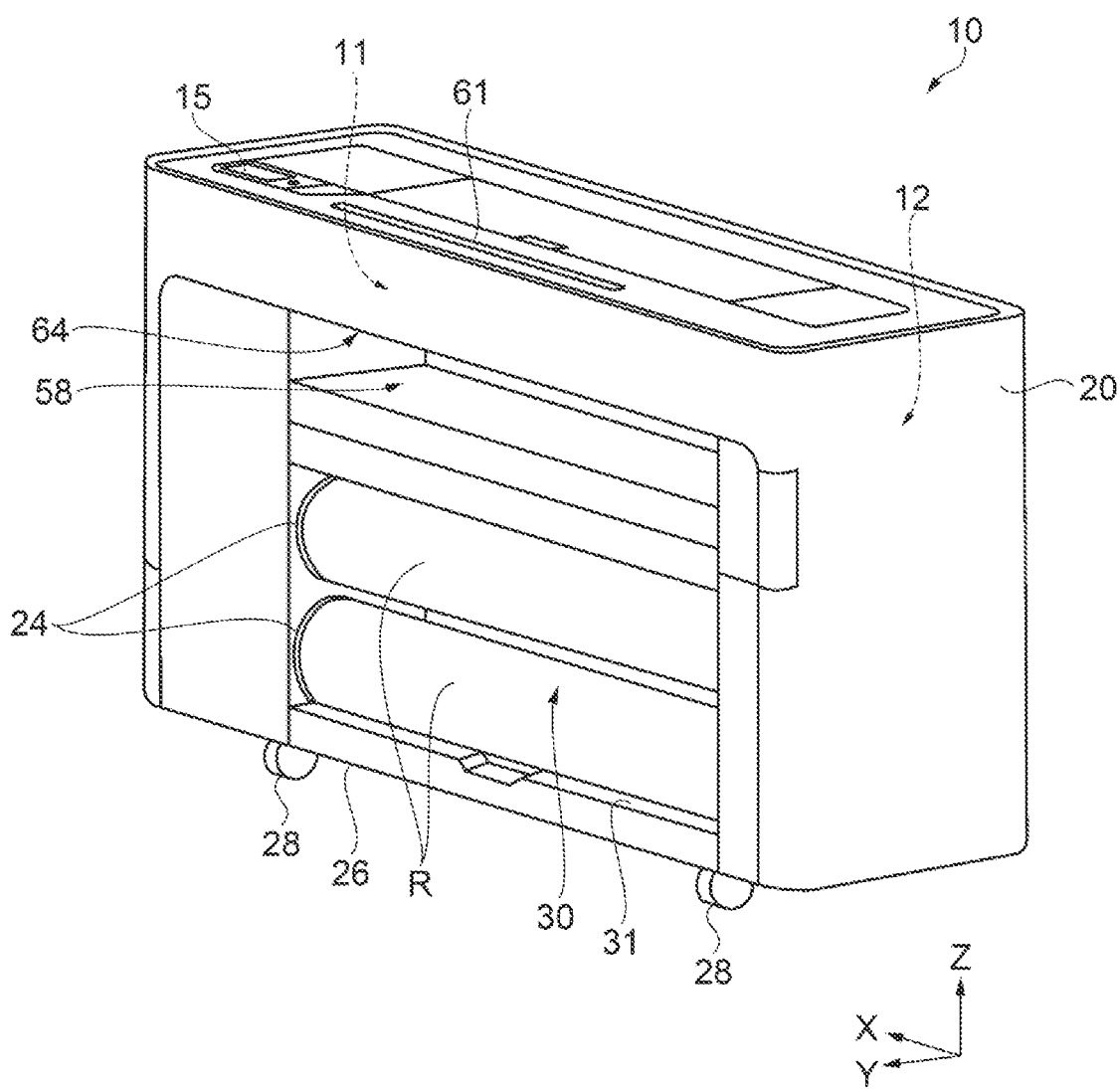
FIG. 1 is a perspective view illustrating a configuration of a multifunction apparatus according to a first embodiment.
Figure 2:
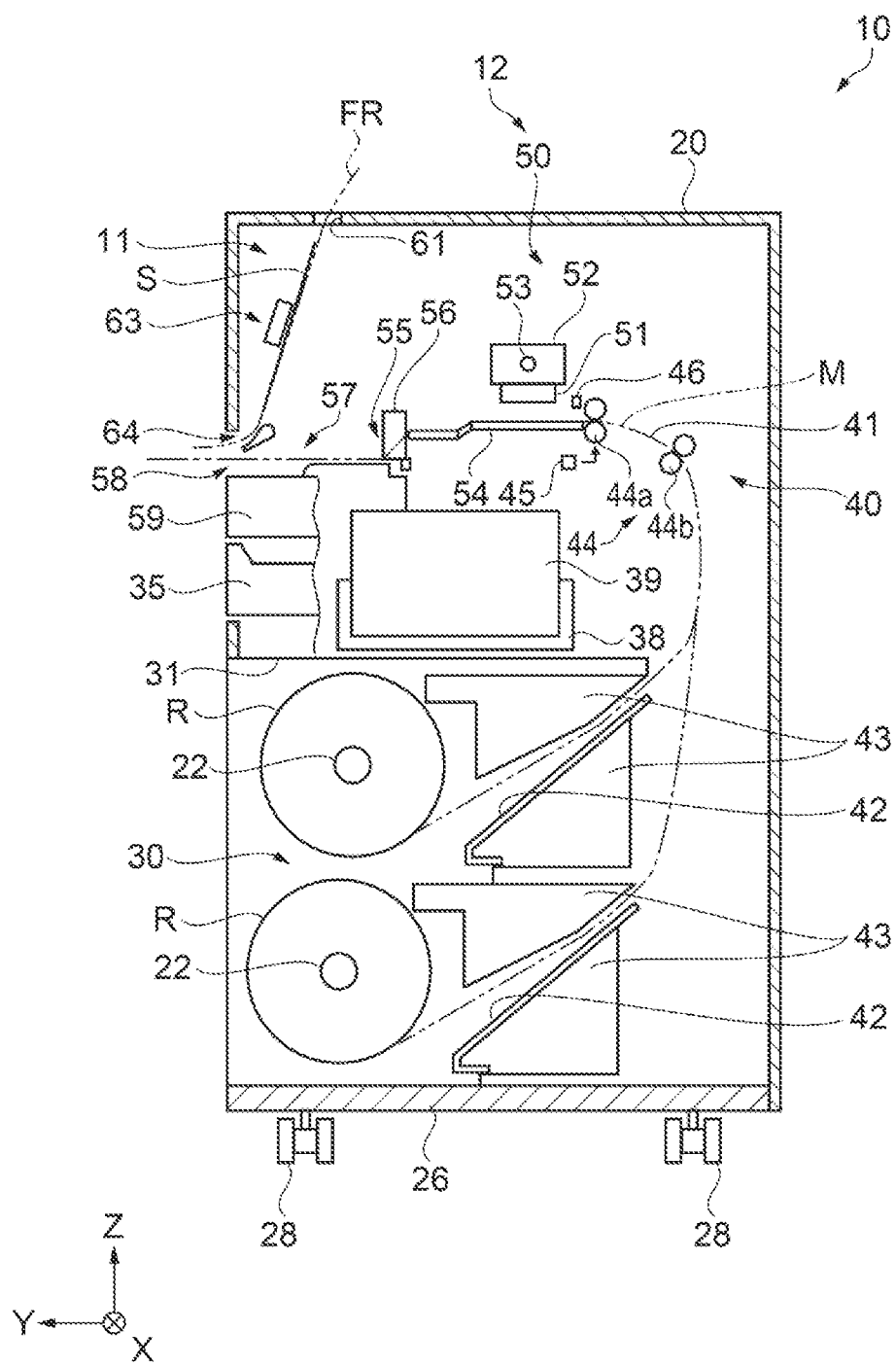
FIG. 2 is a cross-sectional view illustrating the configuration of the multifunction apparatus according to the first embodiment.

First, a configuration of a multifunction apparatus 10 will be described. As illustrated in FIG. 1 and FIG. 2, the multifunction apparatus 10 includes a reading mechanism 11 including a reading unit 63 configured to read information of a document S, and a document discharge port 64 configured to discharge the read document S, and a recording mechanism 12 including a recording unit 50 configured to record the information on a recording medium M, and a medium discharge port 58 configured to discharge the recording medium on which recording was performed M. The multifunction apparatus 10 also includes a control unit 100 (in FIG. 5) that controls the reading mechanism 11 and the recording mechanism 12. The multifunction apparatus 10 according to the present embodiment can simultaneously perform the reading of the document S by the reading mechanism 11 and the recording on the recording medium M by the recording mechanism 12.

Note that the multifunction apparatus 10 is placed on a horizontal plane, and as directions along the horizontal plane, a front-back direction of the multifunction apparatus 10 is defined as a direction along a Y axis and a left-right direction (or a width direction) orthogonal to the Y axis is defined as a direction along an X axis. Furthermore, a direction vertical (up-down direction) to the horizontal plane is defined as a direction along a Z axis.

The multifunction apparatus 10 includes a housing 20 having a rectangular parallelepiped shape. A base frame 26 supporting parts of the multifunction apparatus 10 is provided at a lower portion of the housing 20. The recording unit 50, the reading unit 63, and the like are accommodated in the housing 20.

A plurality of leg portions 28 are provided at the lower portion of the multifunction apparatus 10. The leg portions 28 are coupled to the base frame 26 and support the housing 20. The leg portion 28 is, for example, a caster.

A rectangular opening portion 31 is provided at a front face in the +Y direction of the housing 20, and has a space extending toward the −Y direction. A feeding unit 30 to which a roll body R is detachably installed is disposed in the space. The roll body R has a cylindrical shape in which the recording medium M (for example, paper) is wound up into a roll shape on a core member 22. The recording medium M fed out from the roll body R is fed toward the recording unit 50 side. In the feeding unit 30 according to the present embodiment, two roll bodies R are accommodated side by side in a height direction. Both end portions of the roll body R are supported by a holding member 24 that rotatably holds the roll body R.

The multifunction apparatus 10 includes a medium transport unit 40 in the housing 20. The medium transport unit 40 transports the recording medium M fed out from the roll body R along a transport path 41. The medium transport unit 40 includes a transport path forming unit 43 and a transport roller 44 (44a, 44b). The transport path forming unit 43 is positioned in the −Y direction with respect to the installed roll body R. The transport path forming unit 43 forms a roll paper supply path 42 that guides the recording medium M fed out from the roll body R toward the −Y direction side of the housing 20. The transport roller 44 transports the recording medium M on the transport path 41. The transport roller 44 is a pair of rollers that are rotatably supported with an axis along the width direction as a rotation axis, and is constituted by a driving roller and a driven roller. Then, the driving roller and the driven roller pinch the front and rear surfaces of the recording medium M to support the recording medium M. The normal rotation driving of a drive motor rotationally drives the driving roller, thereby transporting the recording medium M through the transport path 41 to the support portion 54 and transporting the recording medium M from the support portion 54 to the medium discharge port 58 side. The medium discharge port 58 is provided at the front face of the housing 20 in the +Y direction.

Additionally, a medium position detector 45 capable of detecting a position of the leading end of the recording medium M is disposed. The medium position detector 45 includes, for example, a rotary encoder or the like. The rotary encoder is disposed in the drive motor coupled to the driving roller of the transport roller 44a. The rotary encoder is coupled to the control unit 100. The rotary encoder can convert an amount of mechanical displacement of rotation into an electrical signal and process the signal to detect a position, a velocity, and the like.

The rotary encoder is constituted by a slit disk fixed to a rotary shaft of the drive motor, and a position detector disposed at a position through which the circumferential edge of the slit disk passes. A plurality of slits for position detection are formed at equal intervals throughout the entire circumference of the slit disk along the circumferential edge thereof. Then, the position detector includes a light emitting unit constituted by a light emitting diode, and a light receiving unit constituted by a phototransistor so as to face each other with the circumferential edge of the slit disk interposed therebetween. Then, the position detector is configured to output an electrical signal from the light receiving unit when light from the light emitting unit passes through the slit for position detection of the slit disk and is received by the light receiving unit.

The recording unit 50 records (prints) an image on the recording medium M transported to the transport path 41. The recording unit 50 includes a head 51 that ejects ink toward the recording medium M, a carriage 52 on which the head 51 is mounted, and a guide rail 53 disposed along the width direction. Further, the recording unit 50 includes a movement mechanism (not illustrated) that reciprocates the carriage 52 along the guide rail 53. The support portion 54 that supports the recording medium M is provided at a position facing the head 51. The head 51 ejects ink while reciprocating together with the carriage 52 in the width direction of the recording medium M, and thus, the head 51 records information such as an image on the recording medium M supported by the support portion 54.

In addition, a medium detection sensor 46 is disposed between the transport roller 44a and the head 51 in the transport path 41. The medium detection sensor 46 is a sensor that detects the presence or absence of the recording medium M. The medium detection sensor 46 is coupled to the control unit 100, and the drive motor coupled to the driving roller of the transport roller 44a is controlled based on detection data from the medium detection sensor 46. After the recording medium M cut by a cutting unit 55, which will be described later, is discharged from the medium discharge port 58, the control unit 100 controls the medium transport unit 40 to move the leading end of the recording medium M upstream from the head 51, based on the detection data from the medium detection sensor 46, to move the carriage 52 up to a standby position.

For example, the medium detection sensor 46 is a photointerrupter, and includes a light emitting unit that emits light and a light receiving unit that receives light emitted from the light emitting unit. For example, as a light emitting element of the light emitting unit, a light emitting diode (LED) light emitting element, a laser light emitting element or the like is applied. In addition, the light receiving unit is constituted by a phototransistor, a photo IC and the like. Then, a change in light receiving amount between the light emitting unit and the light receiving unit is converted into an electrical signal and output as detection data. The control unit 100 determines the presence or absence of the recording medium M based on the detection data, and controls the drive motor that drives the transport roller 44a. Furthermore, the control unit 100 detects a position of the leading end of the recording medium M by the medium position detector 45 (rotary encoder).

The cutting unit 55 is disposed downstream in the transport direction of the recording unit 50. The cutting unit 55 cuts the recording medium M on which the recording has ended. The cutting unit 55 includes a cutting blade 56, and the cutting blade 56 reciprocates in the width direction (left-right direction) to cut the recording medium M having a long length at a predetermined position.

The cut sheet-shaped recording medium M is discharged from a discharge unit 57 in the +Y direction. The discharge unit 57 is disposed downstream in the transport direction of the cutting unit 55. The discharge unit 57 includes the medium discharge port 58 and a discharge port member 59. The discharge port member 59 is positioned in the +Y direction with respect to the support portion 54, supports the recording medium M passing through the support portion 54, and guides the recording medium M to the medium discharge port 58. The medium discharge port 58 is formed so as to be opened above the discharge port member 59. The recording medium M cut by the cutting unit 55 is discharged to the outside of the multifunction apparatus 10 through the medium discharge port 58.

A stacker 35 is installed between the discharge port member 59 and the feeding unit 30 in the up-down direction. The stacker 35 has a length in the left-right direction equivalent to that of the discharge port member 59, and is configured in a sheet shape. The stacker 35 is accommodated inside the housing 20 and can move in the +Y direction. When the stacker 35 is used, the stacker 35 is used in a state in which the stacker 35 is pulled out in the +Y direction and a deflection is formed. In this state, the cut recording medium M is discharged from the medium discharge port 58, and thus, the recording medium M is stacked onto the stacker 35.

An ink cartridge 39 is installed in the housing 20. The ink cartridge 39 contains ink. The ink cartridge 39 is detachably installed to a cartridge holder 38. A user can replace the ink cartridge 39 from the front face side of the multifunction apparatus 10. The ink contained in the ink cartridge 39 is supplied to the head 51 through a tube.

The reading mechanism 11 is disposed at the upper front face side in the housing 20. A document feeding port 61 is provided at a front side portion of the end surface in the +Z direction (upper surface) of the housing 20. The document feeding port 61 is an opening formed so as to extend in a direction along the X axis. The document S is transported to the inside of the reading mechanism 11 through the document feeding port 61, and reading processing for reading information in the document S by the reading unit 63 is performed. The document S for which the reading processing is performed is discharged from the document discharge port 64 to the outside of the housing 20. Note that the configuration of the reading mechanism 11 will be described later.

An operation unit 15 by which an operation instruction to the multifunction apparatus 10 can be performed is installed on the upper surface of the housing 20. The operation unit 15 includes a display panel such as a liquid crystal. The operation unit 15 includes a tilt mechanism, thereby allowing the operation unit 15 to be used so as to be tilted to an easily operable position.

Next, a configuration of the reading mechanism 11 will be described.

Figure 3:
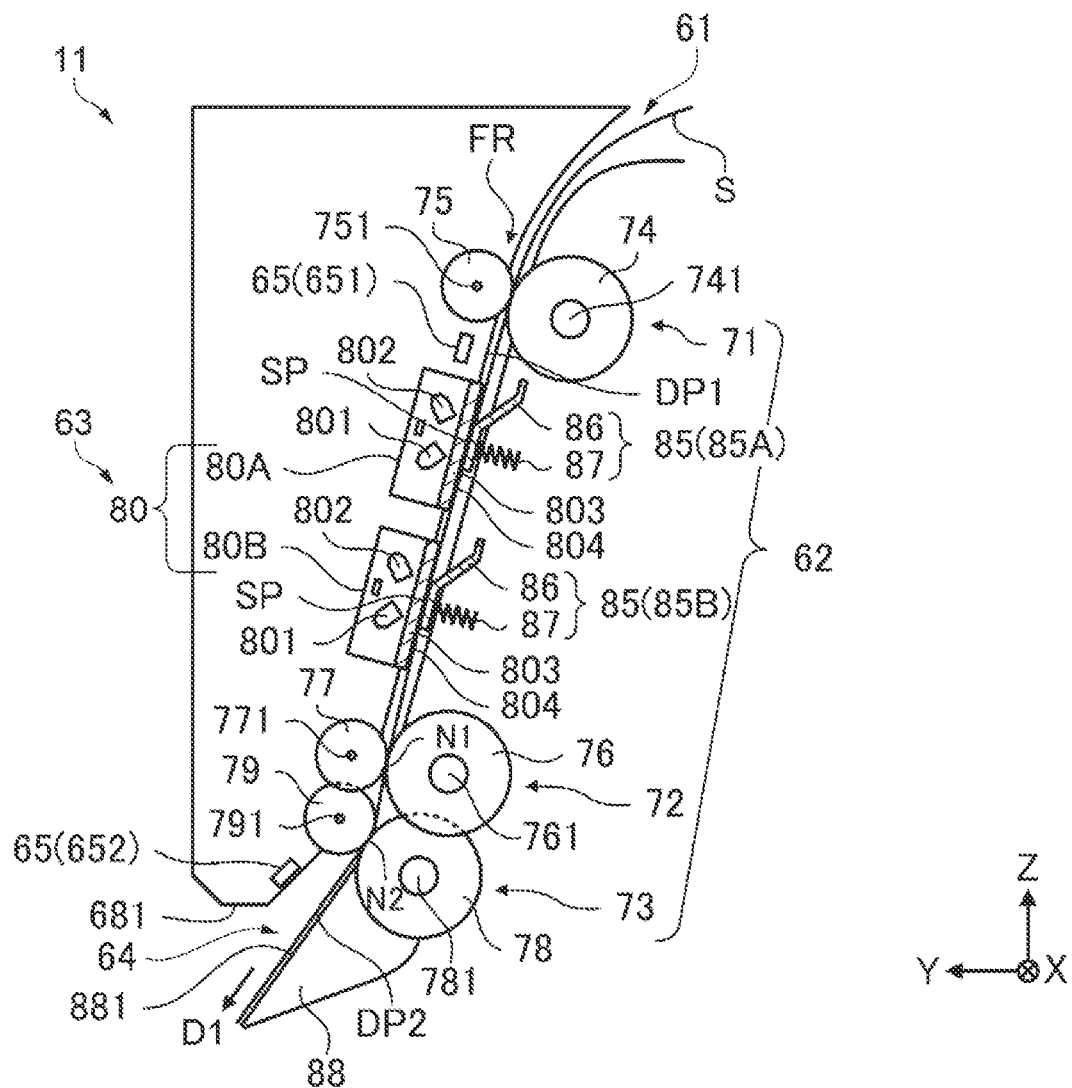
FIG. 3 is a cross-sectional view illustrating a configuration of a reading mechanism according to the first embodiment.

As illustrated in FIG. 3, the reading mechanism 11 includes the document feeding port 61 through which the document S is inserted, the document transport unit 62 configured to transport the document S inserted from the document feeding port 61 along the transport path FR, the reading unit 63 configured to read information such as an image in the document S transported by the transport unit 62, a pressing mechanism 85 configured to press the document S toward the reading unit 63, the document discharge port 64 for reading configured to discharge the read document S, and a sensor unit 65 configured to detect the document S.

The transport path FR extending from the document feeding port 61 to the document discharge port 64 is inclined in the −Z direction along the +Y direction. A first discharge direction D1 serving as a discharge direction of the document S at the document discharge port 64 is a direction including a component in the +Y direction. In detail, the transport path FR is inclined by a predetermined angle that is an acute angle with respect to the −Z direction. Thus, the document S discharged from the document discharge port 64 is moved away from the document discharge port 64. In particular, in a case where the leading end portion of the document S discharged from the document discharge port 64 is curled, when the leading end portion comes close to the medium discharge port 58, the leading end portion may enter the interior of the multifunction apparatus 10 from the medium discharge port 58. Since the first discharge direction D1 includes a component in the +Y direction, the risk of the document S entering the interior of the multifunction apparatus 10 from the medium discharge port 58 is reduced.

The document transport unit 62 includes an upstream driving roller pair 71, a first driving roller pair 72 disposed downstream from the upstream driving roller pair 71 in the transport path FR, and a second driving roller pair 73 disposed downstream from the first driving roller pair 72 in the transport path FR. Each of the upstream driving roller pair 71, the first driving roller pair 72, and the second driving roller pair 73 pinches and transports the document S. The reading unit 63 is disposed between the upstream driving roller pair 71 and the first driving roller pair 72 in the transport path FR. Further, the document transport unit 62 includes a transport motor 62M for reading as a drive motor for driving the upstream driving roller pair 71, the first driving roller pair 72, and the second driving roller pair 73 (see FIG. 5). Note that in the present embodiment, the upstream in the transport path FR means the upstream in the transport direction from the document feeding port 61 toward the document discharge port 64. Similarly, the downstream in the transport path FR means the downstream in the transport direction from the document feeding port 61 to the document discharge port 64.

The upstream driving roller pair 71 is positioned upstream from a readable position SP of the reading unit 63 in the transport path FR, and includes an upstream driving roller 74 and an upstream driven roller 75. The upstream driving roller 74 is rotatably supported about an axis line of an upstream driving shaft 741 extending along the X axis. The outer peripheral surface of the upstream driving roller 74 is covered with a member capable of elastically deforming. For example, the outer peripheral surface of the upstream driving roller 74 is covered with synthetic rubber. The upstream driving roller 74 is driven by the transport motor 62M. The upstream driven roller 75 is rotatably supported about an axis line of an upstream driven shaft 751 extending along the X axis. The axis line of the upstream driving shaft 741 and the axis line of the upstream driven shaft 751 are substantially parallel to each other.

The first driving roller pair 72 is positioned downstream from the readable position SP of the reading unit 63 in the transport path FR, and includes a first driving roller 76 and a first driven roller 77. The first driving roller 76 is rotatably supported about an axis line of a first driving shaft 761 extending along the X axis. The first driving roller 76 is driven by the transport motor 62M. The first driven roller 77 is rotatably supported about an axis line of a first driven shaft 771 extending along the X axis. The axis line of the first driving shaft 761 and the axis line of the first driven shaft 771 are substantially parallel to each other.

The second driving roller pair 73 is positioned downstream from the readable position SP of the reading unit 63 in the transport path FR, and includes a second driving roller 78 and a second driven roller 79. The second driving roller 78 is rotatably supported about an axis line of a second driving shaft 781 extending along the X axis. The second driving roller 78 is driven by the transport motor 62M. The second driven roller 79 is rotatably supported about an axis line of a second driven shaft 791 extending along the X axis. The axis line of the second driving shaft 781 and the axis line of the second driven shaft 791 are substantially parallel to each other.

The reading unit 63 of the present embodiment includes, as a contact image sensor (CIS) module 80, a first CIS module 80A and a second CIS module 80B. The CIS module 80 includes a light source 801 such as an LED that emits light to the document S, a photoreceptor element 802 such as a CMOS sensor that receives reflection light from the document S that is being transferred, and a contact glass 803 that comes into contact with the document S. The document S is transported while contacting a light-transmitting surface 804 of the contact glass 803. The light source 801 emits light to the document S through the contact glass 803, and the photoreceptor element 802 reads the reflection light from the document S.

The light source 801 and the photoreceptor element 802 of the CIS module 80 may be controlled by the control unit 100 or by a dedicated control unit such as a microprocessor provided to the CIS module 80. A reading result of the photoreceptor element 802 of the CIS module 80 is synthesized by the control unit 100, thereby generating image data.

In the CIS module 80 according to the present embodiment, the photoreceptor element 802 is arrayed along the X axis. The CIS module 80 collectively reads a portion facing the document S in the range of a dimension along the X axis. In the present embodiment, the first CIS module 80A and the second CIS module 80B partially overlap each other in the X axis.

The reading mechanism 11 according to the present embodiment includes, as the pressing mechanism 85, a pressing mechanism 85A that biases the document S in a direction in which the document S is pressed against the contact glass 803 of the first CIS module 80A, and a pressing mechanism 85B that biases the document S in a direction in which the document S is pressed against the contact glass 803 of the second CIS module 80B. The pressing mechanism 85 is provided at a position where the document S can be pressed between the upstream driving roller pair 71 and the first driving roller pair 72 in the transport direction of the document S.

The pressing mechanism 85 includes a pressing plate 86 capable of contacting the document S, and a pressing spring 87 that biases the pressing plate 86 in a direction approaching the light-transmitting surface 804. The pressing plate 86 of the pressing mechanism 85A faces the light-transmitting surface 804 of the first CIS module 80A with the transport path FR interposed therebetween. The pressing plate 86 of the pressing mechanism 85B faces the light-transmitting surface 804 of the second CIS module 80B with the transport path FR interposed therebetween.

The document discharge port 64 is a space sandwiched between a discharge guide portion 88 and a wall portion 681 facing the discharge guide portion 88 with the transport path FR interposed therebetween.

The sensor unit 65 includes a first sensor 651 capable of detecting the document S, and a second sensor 652 capable of detecting the document S at a position different from that of the first sensor 651. A first detection position DP1 that is a detection position by the first sensor 651 is positioned upstream in the transport direction of the document S from the light-transmitting surface 804 of the first CIS module 80A. When the document S is positioned at the first detection position DP1, the first sensor 651 detects the document S, and when the document S is not positioned at the first detection position DP1, the first sensor 651 does not detect the document S. A second detection position DP2 that is a detection position by the second sensor 652 is positioned downstream in the transport direction of the document S from the second driving roller pair 73. When the document S is positioned at the second detection position DP2, the second sensor 652 detects the document S, and when the document S is not positioned at the second detection position DP2, the second sensor 652 does not detect the document S.

The discharge guide portion 88 is provided at the −Z direction side from the second driving roller pair 73. The discharge guide portion 88 is a plate-like member extending along the X axis. The discharge guide portion 88 includes a guide surface 881 facing the +Z direction. The guide surface 881 is inclined downward in the −Z direction as going toward the +Y direction. The discharged document S is discharged along the guide surface 881. In other words, the first discharge direction D1 that is the direction in which the document S is discharged is a direction that lowers in the −Z direction as going toward the +Y direction.

Figure 4:
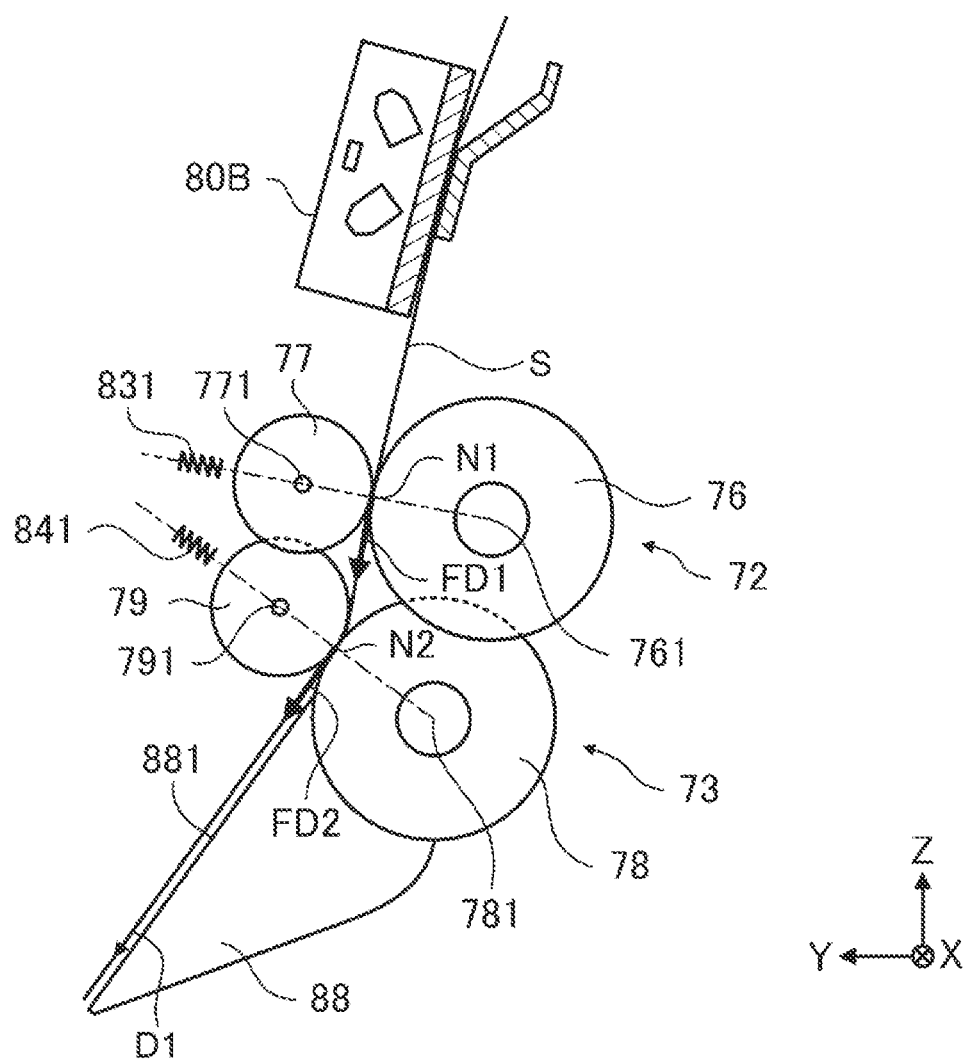
FIG. 4 is a partially enlarged view illustrating the configuration of the reading mechanism according to the first embodiment.

As illustrated in FIG. 4, a first transport direction FD1 that is the transport direction of the document S at a pinching position N1 of the first driving roller pair 72 is a direction in which a component of −Z that is a vertically lower direction is more included than a component in the +Y direction. Note that in the present embodiment, the first transport direction FD1 is a direction along a tangent line of the first driving roller 76 passing through the pinching position N1. In the present embodiment, an intersection between a straight line coupling the center of the first driving shaft 761 and the center of the first driven shaft 771 and the outer peripheral surface of the first driving roller 76 is regarded as the pinching position N1.

A second transport direction FD2 that is the transport direction of the document S at a pinching position N2 of the second driving roller pair 73 is a direction in which a component of −Z that is a vertically lower direction is more included than a component in the +Y direction. Furthermore, a ratio of the component in the +Y direction with respect to the component of −Z that is the vertically lower direction in the second transport direction FD2 is larger than a ratio of the component in the +Y direction with respect to the component of −Z that is the vertically lower direction in the first transport direction FD1. In the present embodiment, the second transport direction FD2 is a direction along a tangent line of the second driving roller 78 passing through the pinching position N2. In the present embodiment, an intersection between a straight line coupling the center of the second driving shaft 781 and the center of the second driven shaft 791 and the outer peripheral surface of the second driving roller 78 is regarded as the pinching position N2.

A first unit feeding amount in which the first driving roller 76 can feed the document S by one rotation is larger than a second unit feeding amount in which the second driving roller 78 can feed the document S by one rotation. That is, a peripheral velocity of the second driving roller 78 is smaller than a peripheral velocity of the first driving roller 76. A difference in peripheral velocity between the first driving roller 76 and the second driving roller 78 is set by a difference in roller diameter in the present embodiment. That is, in the present embodiment, a diameter of the second driving roller 78 is smaller than a diameter of the first driving roller 76, and the first driving roller 76 and the second driving roller 78 are driven at the same rotational velocity by the transport motor 62M. Thus, the peripheral velocity of the second driving roller 78 is smaller than the peripheral velocity of the first driving roller 76. In the present embodiment, the roller diameter of the first driving roller 76 and the roller diameter of the second driving roller 78 are different, but the first unit feeding amount of the first driving roller 76 is larger than the second unit feeding amount of the second driving roller 78. For example, the first driving roller 76 and the second driving roller 78 may have the same roller diameter, and the rotational velocity of the first driving roller 76 may be larger than the rotational velocity of the second driving roller 78. Also, both the roller diameters and the rotational velocities may be different from each other.

Since the second unit feeding amount of the second driving roller 78 is smaller than the first unit feeding amount of the first driving roller 76, the second driving roller pair 73 does not pull the document S downstream. Thus, variations in transport velocity in a portion of the document S at the readable position SP due to a transport force when the second driving roller pair 73 transports the document S are suppressed.

Also, the pinching force between the second driving roller 78 and the second driven roller 79 that constitute the second driving roller pair 73 is smaller than the pinching force between the first driving roller 76 and the first driven roller 77 that constitute the first driving roller pair 72.

The first driven roller 77 constituting the first driving roller pair 72 is biased in a direction toward the first driving roller 76 by a first spring 831. Thus, the pinching force of the first driving roller pair 72 pinching the document S is determined by a biasing force of the first spring 831. The first spring 831 is a compression spring. Note that the first spring 831 is not limited to the compression spring, and may be another spring such as a rod spring, for example, as long as a biasing force can be applied to the first driven roller 77.

The second driven roller 79 constituting the second driving roller pair 73 is biased in a direction toward the second driving roller 78 by a second spring 841. Thus, the pinching force of the second driving roller pair 73 pinching the document S is determined by a biasing force of the second spring 841. The second spring 841 is a rod spring. Note that the second spring 841 is not limited to the rod spring, and may be another spring such as a compression spring, for example, as long as a biasing force can be applied to the second driven roller 79.

A spring constant of the second spring 841 is smaller than a spring constant of the first spring 831. That is, the second spring 841 has a smaller biasing force than that of the first spring 831. Thus, the pinching force of the second driving roller pair 73 is weaker than the pinching force of the first driving roller pair 72.

Next, the control configuration of the multifunction apparatus 10 will be described.

Figure 5:
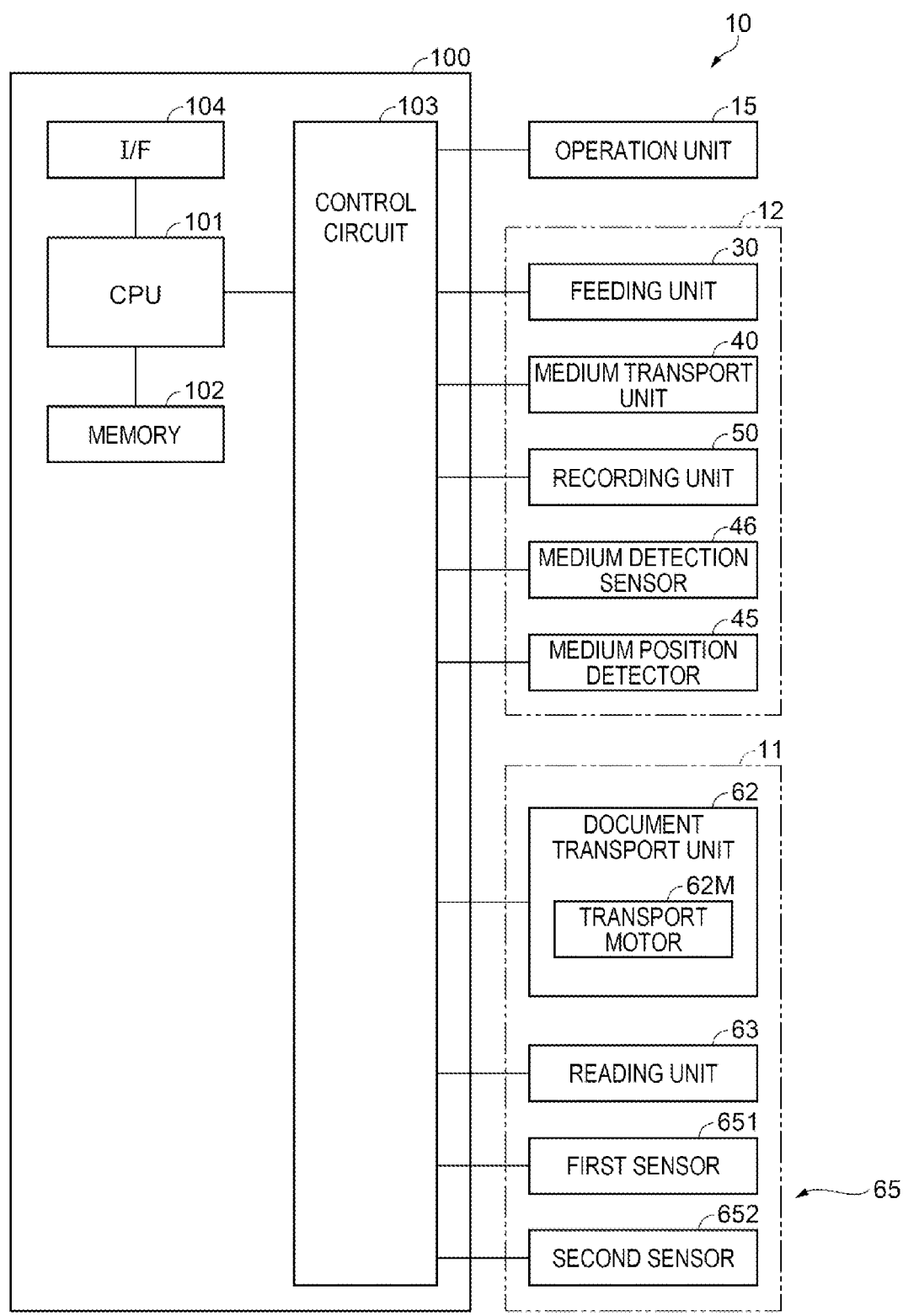
FIG. 5 is a block diagram illustrating a control configuration of the multifunction apparatus according to the first embodiment.

As illustrated in FIG. 5, the multifunction apparatus 10 includes the control unit 100. The control unit 100 includes a CPU 101, a memory 102, a control circuit 103, and an interface (I/F) 104. The CPU 101 is an arithmetic processing device. The memory 102 is a device ensuring a region for storing programs of the CPU 101, a working region or the like, and includes a storage element such as a RAM or EEPROM.

The control unit 100 is coupled to the operation unit 15. An operation signal output when the operation unit 15 is operated is input to the control unit 100. When the operation unit 15 is operated, the operation unit 15 outputs a reading request signal, and when the reading request signal is input to the control unit 100, the control unit 100 accepts the reading request. When accepting the reading request, the control unit 100 controls the reading mechanism 11 and the recording mechanism 12, reads an image of the document S by the reading unit 63 of the reading mechanism 11 to generate image data, and causes the recording mechanism 12 to record an image based on the generated image data on the recording medium M.

The sensor unit 65 is electrically coupled to the control unit 100. The control unit 100 determines a state of the document S based on a change of the output by the sensor unit 65.

The first sensor 651 is electrically coupled to the control unit 100 as the sensor unit 65 to be electrically coupled to the control unit 100. An output from the first sensor 651 when the first sensor 651 detects the document S is a first output, and an output from the first sensor 651 when the first sensor 651 does not detect the document S is a second output. When the output from the first sensor 651 changes from the second output to the first output, the control unit 100 determines that the leading end of the document S has passed through the first detection position DP1. When the leading end of the document S passes through the first detection position DP1, the control unit 100 starts counting of a rotational amount of the transport motor 62M by a counter (not illustrated). The control unit 100 synthesizes a reading result by the photoreceptor element 802 of the reading unit 63 based on a position of the document S estimated from the count value.

Additionally, when the output from the first sensor 651 changes from the first output to the second output, the control unit 100 determines that the rear end of the document S has passed through the first detection position DP1. The control unit 100 starts counting by the counter when the rear end of the document S passes through the first detection position DP1. The control unit 100 performs the holding operation of the document S, which will be described later, based on a position of the rear end of the document S estimated from the count value.

As the sensor unit 65 to be electrically coupled to the control unit 100, the second sensor 652 is electrically coupled to the control unit 100. An output from the second sensor 652 when the second sensor 652 detects the document S is a third output, and an output from the second sensor 652 when the second sensor 652 does not detect the document S is a fourth output. The second sensor 652 detects the document S pinched by the second driving roller pair 73 in the holding operation of the document S, which will be described later. In the holding operation of the document S, when the output from the second sensor 652 changes from the third output to the fourth output, the control unit 100 determines that the document S pinched by the second driving roller pair 73 has been removed from the multifunction apparatus 10.

Note that the control unit 100 is configured to be capable of bidirectional communication with an external device (for example, a personal computer, or the like) through the I/F 104. The control unit 100 can be input with the recording request signal and the reading request signal that are output from the external device coupled to the I/F 104. Note that the I/F 104 may be configured to be capable of wired connection, or may be configured to be capable of wireless connection.

Next, a control method for the holding operation of the document S by the reading mechanism 11 will be described. In detail, when the document S discharged from the document discharge port 64 unexpectedly falls downward, the document S may deform. Thus, in the present embodiment, the holding operation of holding the document S discharged from the document discharge port 64 in the reading mechanism 11 is performed.

Details will be described below.

Figure 6:
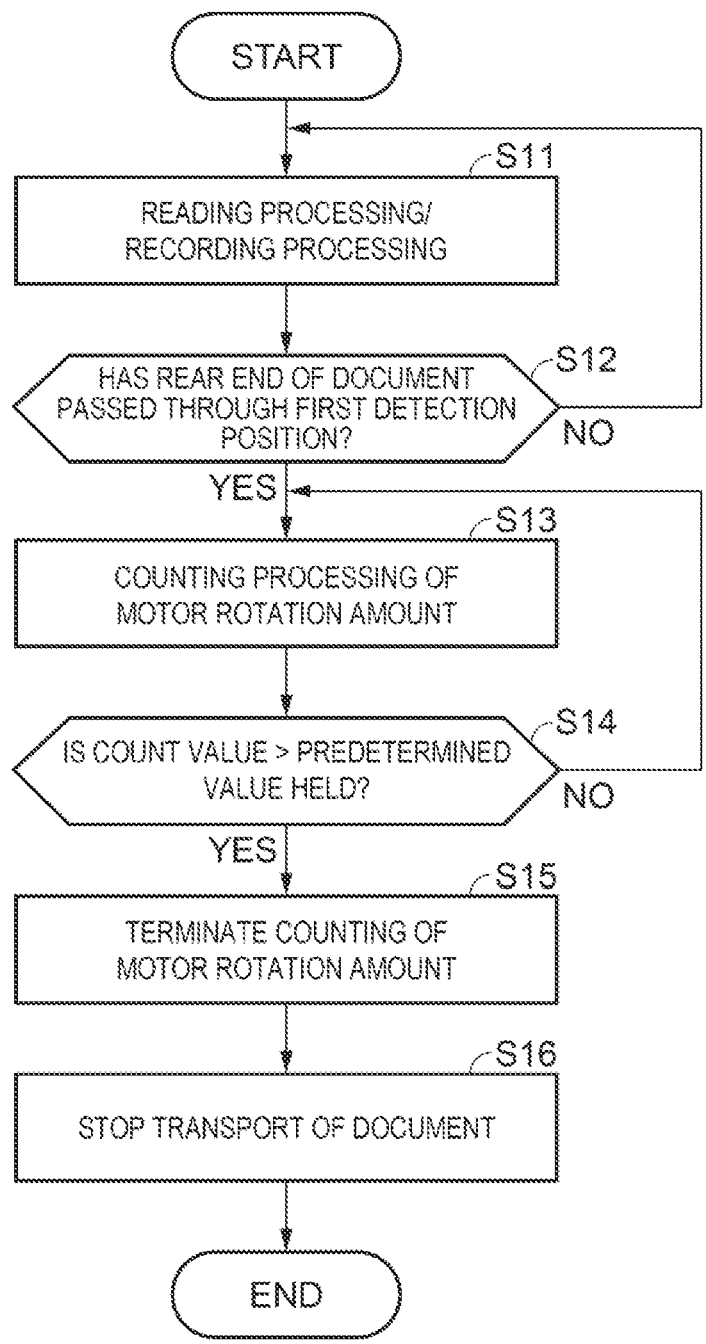
FIG. 6 is a flowchart illustrating a control method for a document holding operation of the reading mechanism according to the first embodiment.

As illustrated in FIG. 6, first, in step S11, the control unit 100 performs reading processing and recording processing. Specifically, when receiving a reading request, the control unit 11 controls the transport motor 62M to rotate the upstream driving roller pair 71, the first driving roller pair 72, and the second driving roller pair 73, thereby starting transport of the document S inserted into the document feeding port 61. After starting the transport of the document S, the control unit 100 controls the reading unit 63 and causes the reading unit 63 to read an image (information) of the document S when the document S passes through the readable position SP.

In step S12, the control unit 100 determines whether the rear end of the document S has passed through the first detection position DP1 after starting the transport of the document S in step S11. In more detail, a change of the output from the first sensor 651 from the first output indicating that the document S is detected, to the second output indicating that the document S is not detected is monitored. When the output from the first sensor 651 changes from the first output to the second output (YES), the control unit 100 determines that the rear end of the document S has passed through the first detection position DP1.

The control unit 100 controls the light source 801 of each CIS module 80 so that white light is irradiated on the document S. The control unit 100 is input with results detected by the plurality of photoreceptor elements 802 through red, blue, and green filters. As described above, when the leading end of the document S passes through the first detection position DP1, counting of a rotational amount of the transport motor 62M is started by the counter (step S13). The control unit 100 synthesizes the detection results from the photoreceptor elements 802 of the plurality of CIS modules 80 based on the count value by the counter, and thus, generates image data of characters, images, and the like recorded on the document S. Note that the control unit 100 stores the generated image data in the memory 102.

Furthermore, the control unit 100 causes the recording mechanism 12 to perform recording on the recording medium M based on the image data stored in the memory 102. Specifically, the control unit 100 controls the medium transport unit 40 to transport the recording medium M. Then, the control unit 100 controls the recording unit 50, and causes the recording unit 50 to eject ink to the recording medium M when the recording medium M passes through the recording position by the recording unit 50. This records the image data on the recording medium M. The control unit 100 discharges the recording medium M on which the image data is recorded toward the medium discharge port 58.

In step S14, the control unit 100 determines whether the count value by the counter has exceeded a predetermined value that is preset (step S14).

Here, the predetermined value used in the determination in step S14 is a value corresponding to the length between the first detection position DP1 by the first sensor 651 and the pinching position N1 in the transport path FR. In more detail, the predetermined value is set based on the length between the first detection position DP1 and the pinching position N1 in the transport path FR and the peripheral velocity of the first driving roller 76. Thus, the predetermined value is set such that the rear end of the document S is positioned at the pinching position N1 when the count value reaches the predetermined value after the rear end of the document S passes through the first detection position DP1. Thus, the determination in step S14 by the control unit 100 is regarded as a determination of whether the rear end of the document S has passed through the pinching position N1.

When the control unit 100 determines that the count value by the counter has exceeded the predetermined value (YES), the control unit 100 terminates the counting of the count value by the counter (step S15), and controls the transport motor 62M to stop the transport of the document S (step S16). Thus, the control unit 100 stops the rotation of the upstream driving roller pair 71, the first driving roller pair 72, and the second driving roller pair 73 in a state where the document S is not positioned at the readable position SP by the reading unit 63, and the document S is not positioned at the pinching position N1. In step S16, the control unit 100 stops the transport of the document S before the rear end of the document S passes through the pinching position N2 of the second driving roller pair 73. Note that in the present embodiment, the control unit 100 performs step S16 after performing step S15, but it is only required that step S16 is performed before the rear end of the document S passes through the pinching position N2, and a configuration in which step S16 is performed before step S15, or a configuration in which step S15 and step S16 are performed in parallel may be adopted.

Figure 7:
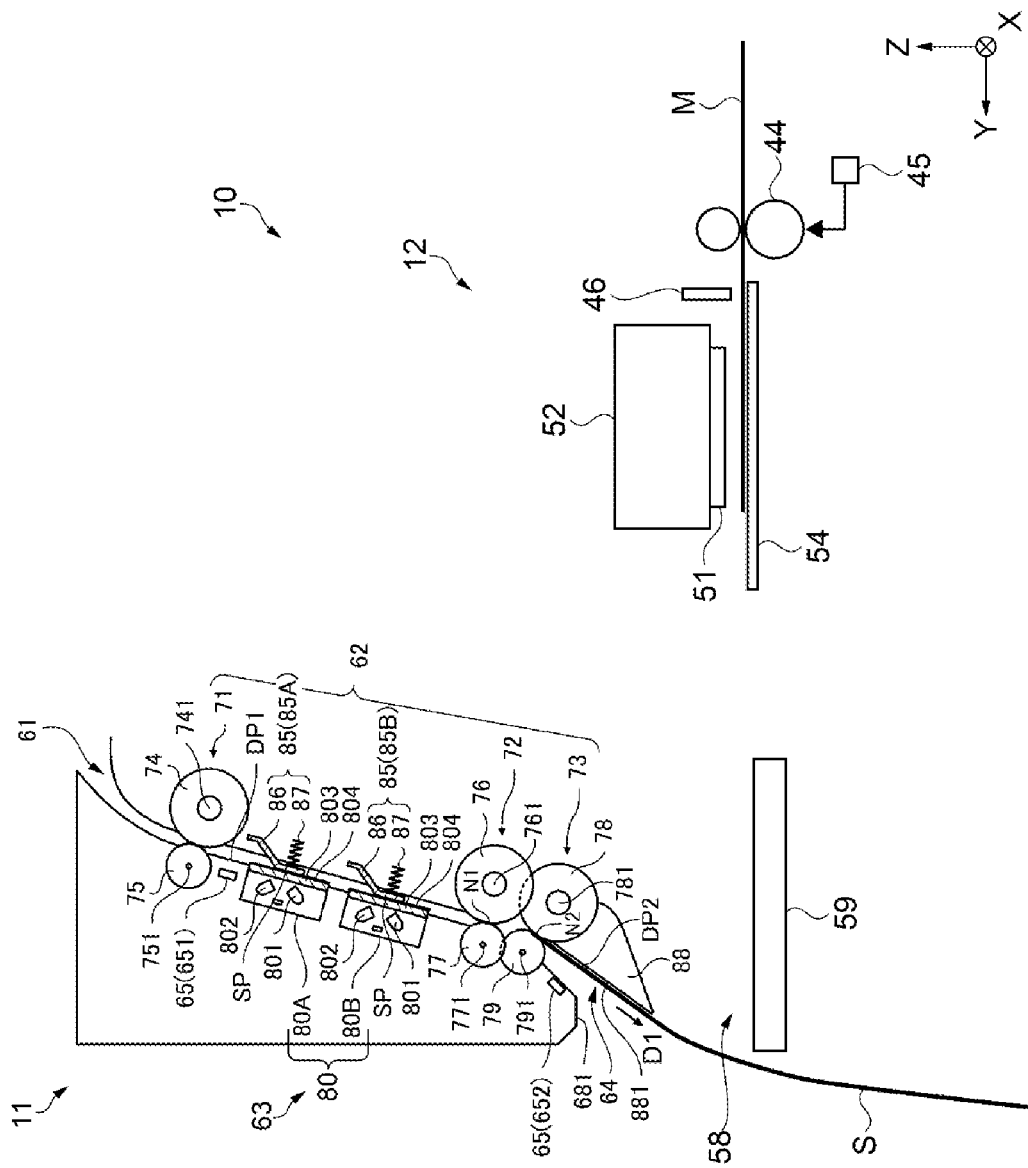
FIG. 7 is a schematic view illustrating the control method for the document holding operation of the reading mechanism according to the first embodiment.

When the control unit 100 stops the transport of the document S in step S16, as illustrated in FIG. 7, the document S is held in the multifunction apparatus 10 without falling down from the document discharge port 64. In more detail, the document S is held by the reading mechanism 11 (the multifunction apparatus 10) in a state where the vicinity of the rear end of the document S is pinched by the second driving roller pair 73, and the document S is hung down from the document discharge port 64 such that the leading end of the document S faces downward. This makes it possible to prevent the document S from which the image is read by the reading unit 63 from unexpectedly falling down from the document discharge port 64.

Here, the positional relationship between the document discharge port 64 of the reading mechanism 11 and the medium discharge port 58 of the recording mechanism 12 and the like will be described.

Figure 8:
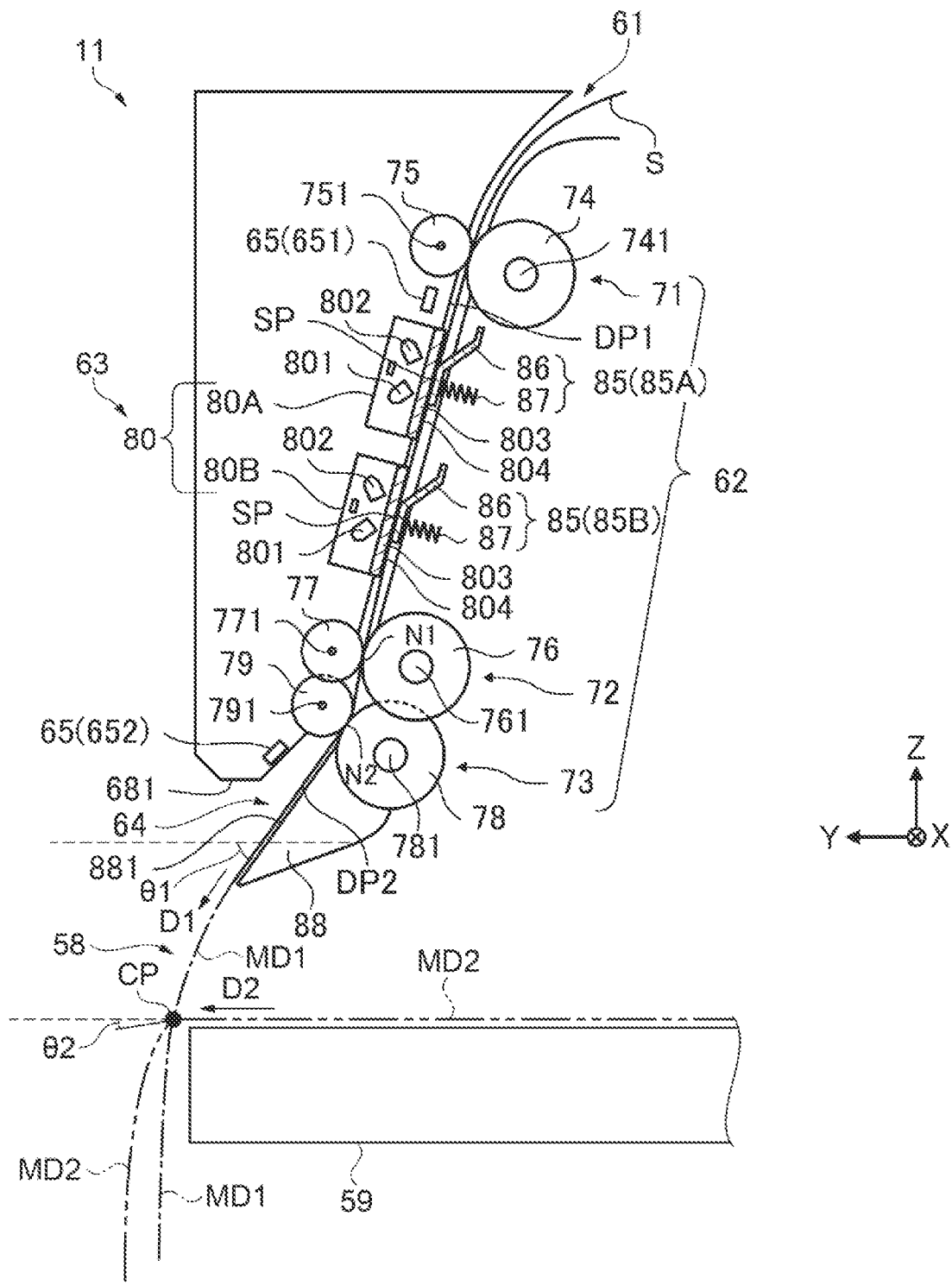
FIG. 8 is a partially enlarged view illustrating the configuration of the multifunction apparatus according to the first embodiment.

As illustrated in FIG. 8, the document discharge port 64 is disposed upward in the vertical direction of the medium discharge port 58. Then, a second path MD2 that is a path through which the leading end of the recording medium M discharged from the medium discharge port 58 passes, and the document S discharged from the document discharge port 64 have such a positional relationship to intersect with each other at the intersecting position CP.

A first path MD1 through which the leading end of the document S discharged from the document discharge port 64 passes is along the first discharge direction D1 and the −Z direction including a component in the +Y direction in a state where the leading end of the document S is transported while being supported on the discharge guide portion 88. Then, the first path MD1 is along the −Z direction in a state where the leading end of the document S is discharged to the outside from the document discharge port 64.

On the other hand, a second path MD2 through which the leading end of the recording medium M discharged from the medium discharge port 58 passes is along the second discharge direction D2 and substantially along the +Y direction (horizontal direction) in a state where the leading end of the recording medium M is transported while being supported on the discharge port member 59, and then, is along the −Z direction in a state where the leading end of the recording medium M is discharged to the outside from the medium discharge port 58.

The intersecting position CP where the document S and the recording medium M intersect with each other is a position where the first path MD1 through which the leading end of the document S passes and the second path MD2 through which the leading end of the recording medium M passes intersect with each other, is a position substantially along the upper surface of the discharge port member 59, and is a position of the discharge port member 59 in the +Y direction.

Thus, when the leading end of the document S is positioned at the intersecting position CP, and then, the recording medium M is discharged along the second discharge direction D2, the document S blocks the second path MD2 of the leading end of the recording medium M. In other words, when the leading end of the document S is positioned at the intersecting position CP and when the leading end of the document S is positioned below the intersecting position CP, the document S is at a position where the second path MD2 of the leading end of the recording medium M is blocked.

Additionally, in the multifunction apparatus 10 according to the present embodiment, a first angle θ1 that is an angle of the document in the first discharge direction D1 at the document discharge port 64 with respect to the horizontal direction in the reading mechanism 11 is larger than a second angle θ2 that is an angle of the recording medium M in the second discharge direction D2 at the medium discharge port 58 with respect to the horizontal direction in the recording mechanism 12.

In other words, the multifunction apparatus 10 including the reading mechanism 11 and the recording mechanism 12 is not configured to discharge the document S in the horizontal direction and to hold the document S, but configured to direct the document S downward and to hold the document S, so that the damage or form tendency of the document S can be suppressed.

On the other hand, in a state in which the holding operation of the document S is performed, that is, in a state where the document S is hung down from the document discharge port 64, the leading end of the document S exceeds the intersecting position CP and is positioned downward, and as illustrated in FIG. 7, the medium discharge port 58 from which the recording medium M is discharged is occluded by the held document S, and the second path MD2 of the leading end of the recording medium M is blocked. In this way, when the recording medium M is discharged to the medium discharge port 58 in the state where the medium discharge port 58 is occluded by the document S, the leading end of the discharged recording medium M is brought into contact with the document S. Furthermore, the discharging operation of the recording medium M is performed in a state where the movement of the recording medium M in the +Y direction is inhibited by the document S, and thus, the recording medium M is clogged in the housing 20, and transporting jam occurs.

Thus, the control unit 100 of the multifunction apparatus 10 according to the present embodiment controls the reading mechanism 11 and the recording mechanism 12 to suppress such a transport trouble.

Specifically, when the leading end of the recording medium M is discharged from the medium discharge port 58 in a stop state where discharging the document S is stopped at a position where the document S discharged from the document discharge port 64 blocks the second path MD2 of the leading end of the recording medium M discharged from the medium discharge port 58, the control unit 100 performs a predetermined operation for canceling the stop state before the leading end of the recording medium M is reached to the intersecting position CP. The stop state is, for example, a state in which the holding operation for holding the document S discharged from the document discharge port 64 is continued. In addition, the position where the document S discharged from the document discharge port 64 blocks the second path MD2 of the leading end of the recording medium M means a position where the leading end of the document S discharged from the document discharge port 64 includes the intersecting position CP, and is positioned downward the intersecting position CP. In other words, the position where the document S discharged from the document discharge port 64 blocks the second path MD2 of the leading end of the recording medium M means a position where the document S occludes the medium discharge port 58 when viewed in the −Y direction. As a result, discharging the leading end of the recording medium M toward the medium discharge port 58 in the stop state of the document S may cause the transporting jam.

The control method will be specifically described below. Note that step S101 to step S106 in FIG. 9 are similar to step S11 to step S16 in FIG. 6, so descriptions thereof will be omitted.

Figure 9:
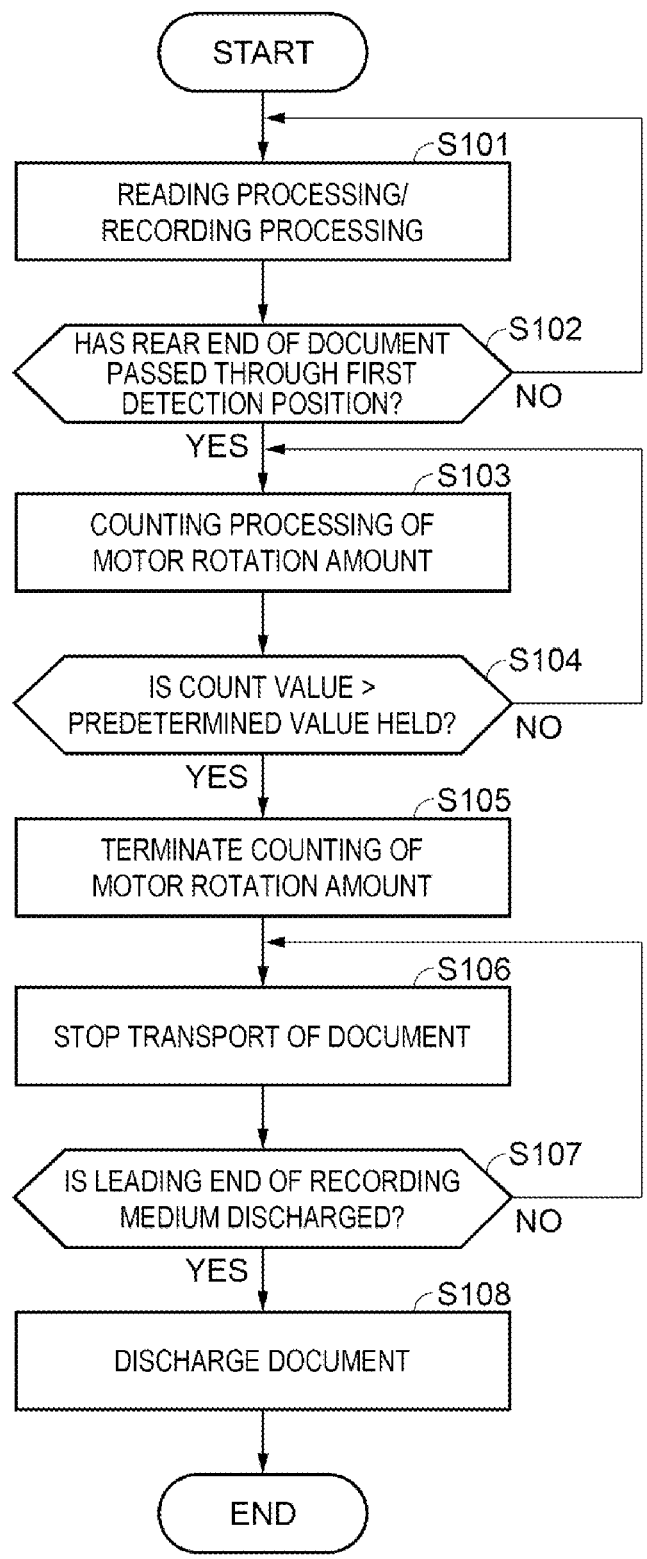
FIG. 9 is a flowchart illustrating the control method for the multifunction apparatus according to the first embodiment.

As illustrated in FIG. 9, in step S107, the control unit 100 determines whether the leading end of the recording medium M is discharged from the medium discharge port 58. In detail, the control unit 100 determines whether the leading end of the recording medium on which recording was performed M is near the medium discharge port 58. Specifically, the control unit 100 detects a position of the leading end of the recording medium M based on detection data by the medium position detector 45. Note that, since the position of the medium discharge port 58 is known, whether the leading end of the recording medium M is near the medium discharge port 58 can be easily determined by detecting the position of the leading end of the recording medium M.

Figure 10:
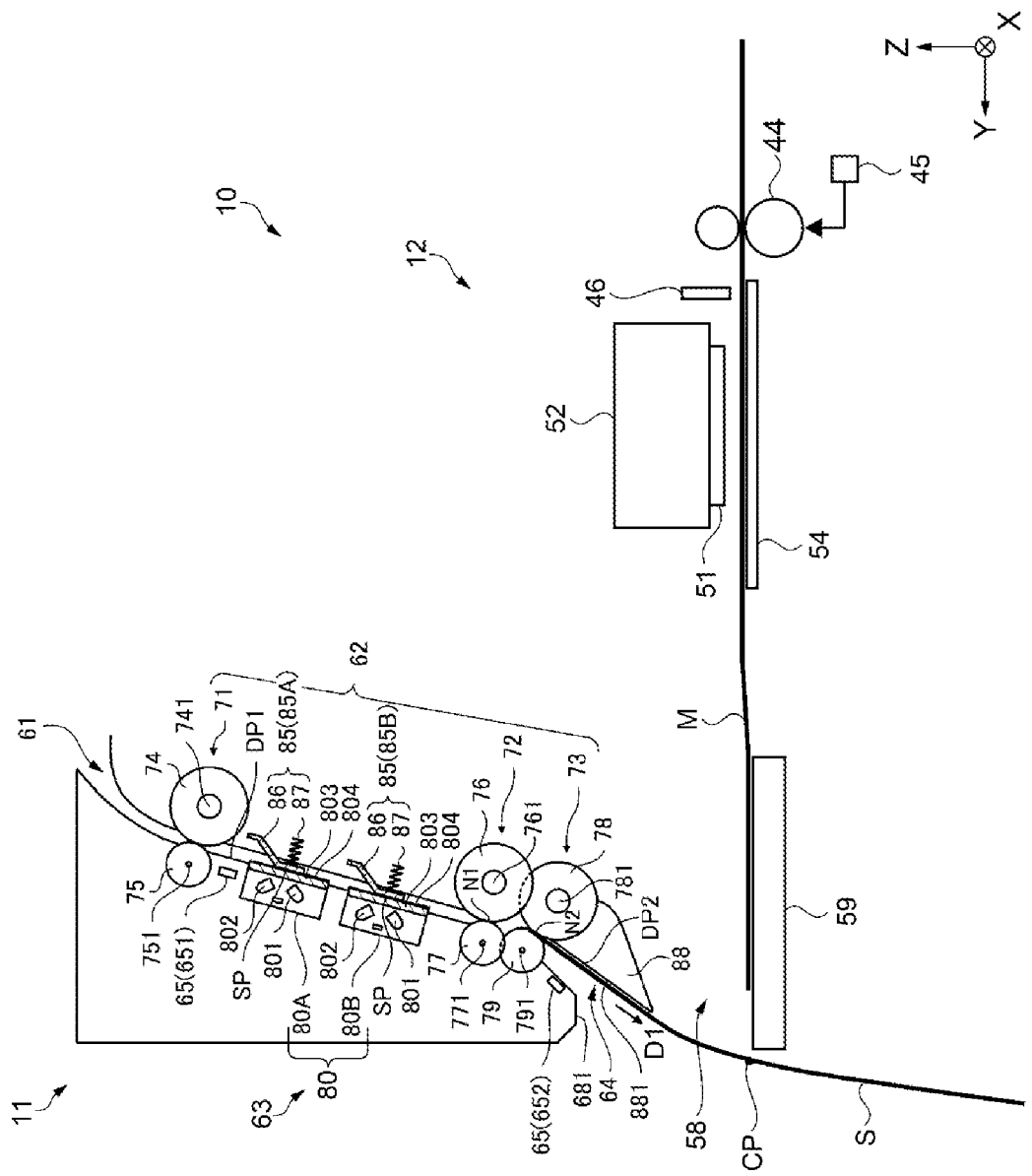
FIG. 10 is a schematic view illustrating the control method for the multifunction apparatus according to the first embodiment.

Then, as illustrated in FIG. 10, when the control unit 100 determines that the leading end of the recording medium M is near the medium discharge port 58 in the stop state of the document S (YES), the control unit 100 proceeds to step S108. On the other hand, when the control unit 100 determines that the leading end of the recording medium M is not near the medium discharge port 58 (NO), the control unit 100 proceeds to step S106, and continues the recording operation.

Figure 11:
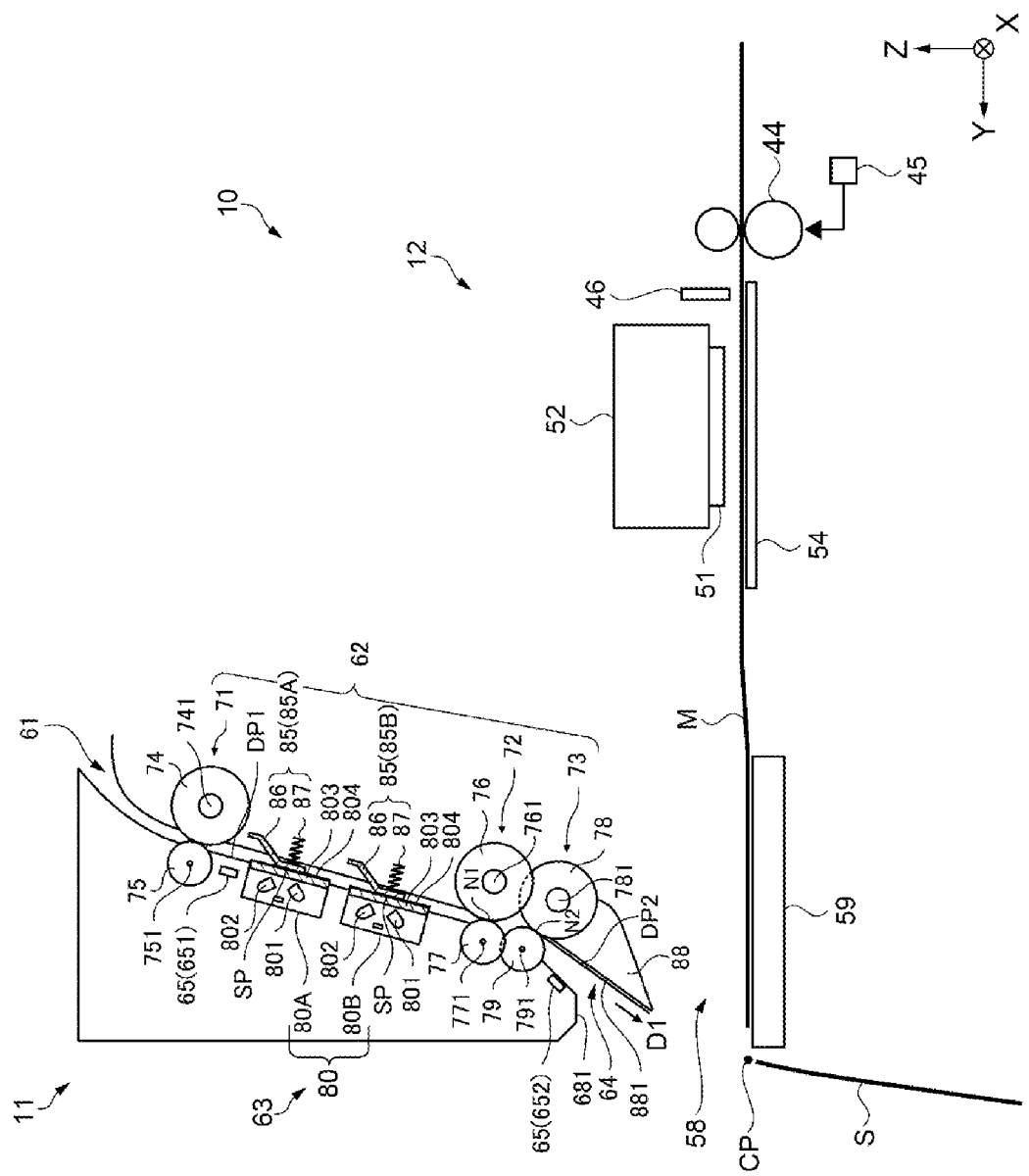
FIG. 11 is a schematic view illustrating the control method for the multifunction apparatus according to the first embodiment.
Figure 12:
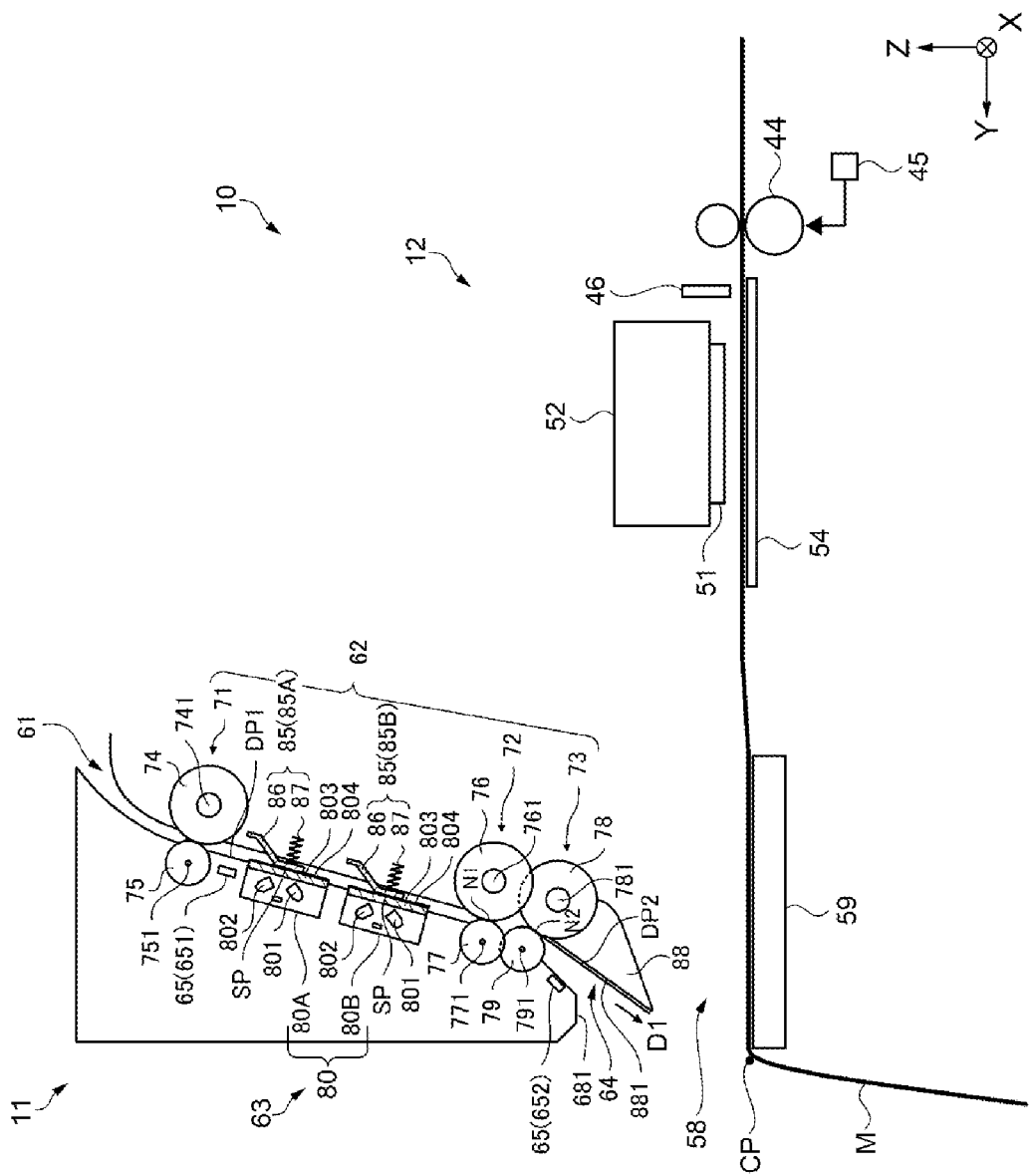
FIG. 12 is a schematic view illustrating the control method for the multifunction apparatus according to the first embodiment.

In step S108, in a state where the rear end of the document S is nipped by the second driving roller 78, the control unit 100 discharges the document S by using the second driving roller 78 serving as a discharging roller as a predetermined operation to cancel the stop state. Specifically, the control unit 100 drives the transport motor 62M. Thus, as illustrated in FIG. 11, the second driving roller 78 drives and rotates, the document S pinched by the second driving roller pair 73 at the pinching position N2 is released, and the entire document S is discharged from the document discharge port 64. This cancels the stop state and releases the medium discharge port 58. Then, as illustrated in FIG. 12, the recording operation is continuously performed, and the recording medium M is discharged from the medium discharge port 58. Note that the recording operation for discharging the recording medium M also includes the operation of simply transporting the recording medium M.

As described above, according to the present embodiment, the stop state of the document S is canceled before the leading end of the recording medium M reaches the intersecting position CP. Specifically, due to the drive of the second driving roller 78, the document S being in the stop state is discharged, and the stop state is canceled. Thus, since the document S does not occlude the second path MD2 of the recording medium M, the recording medium M can be smoothly discharged without collision of the recording medium M with the document S.

Note that, in the present embodiment, the stop state is canceled by the drive of the second driving roller 78, but the present disclosure is not limited thereto, and for example, a distance between the second driving roller 78 and the second driven roller 79 in the second driving roller pair 73 may be configured to be changeable between the pinching position N2 where the document S is pinched and a release position for releasing the pinching state of the document S, to cancel the stop state by the change to the release position at which the pinching state of the document S is released.

2. Second Embodiment

Next, a second embodiment will be described. Note that configurations identical to those in the first embodiment will be denoted by the same reference signs and redundant descriptions will be omitted.

Figure 13:
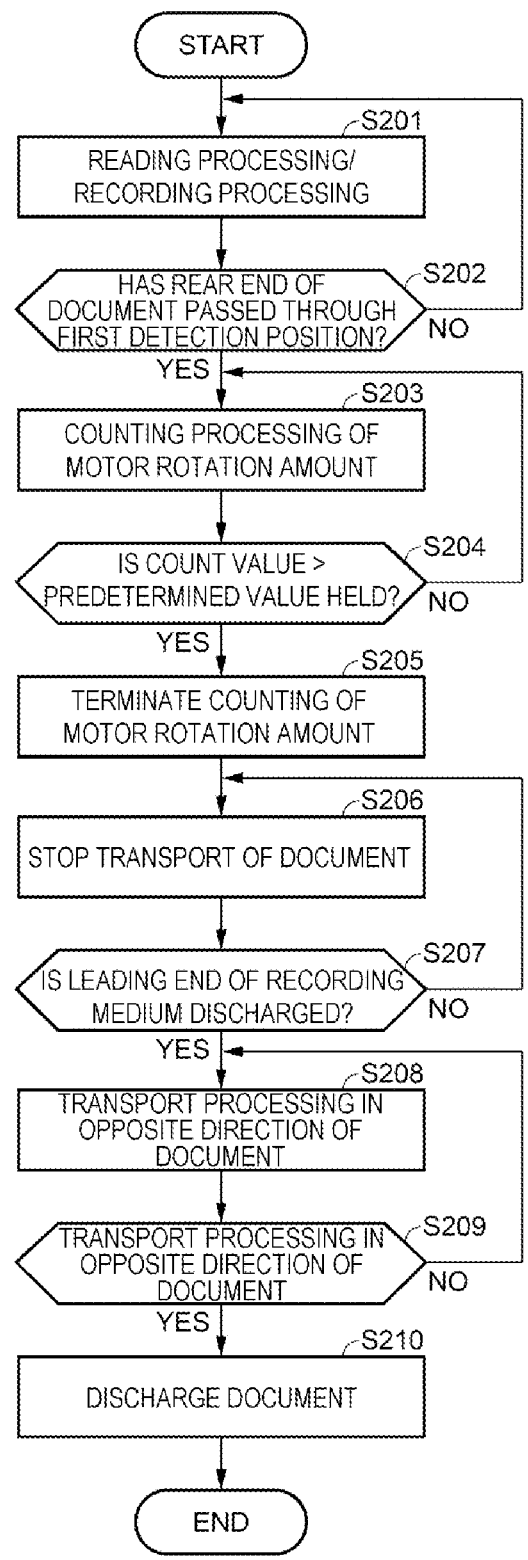
FIG. 13 is a flowchart illustrating a control method for a multifunction apparatus according to a second embodiment.

FIG. 13 illustrates a control method for the multifunction apparatus 10 according to the present embodiment. Note that the contents of step S201 to step S207 are similar to those of step S101 to step S107 (FIG. 9) of the first embodiment, and thus descriptions thereof will be omitted.

As illustrated in FIG. 13, in step S207, when the control unit 100 determines that the leading end of the recording medium M is near the medium discharge port 58 in the stop state of the document S (YES), the control unit 100 proceeds to step S208. On the other hand, when the control unit 100 determines that the leading end of the recording medium M is not near the medium discharge port 58 (NO), the control unit 100 proceeds to step S206 to continue the recording operation.

In step S208, the control unit 100 transports the document S in a direction opposite to the first discharge direction D1 up to a position where the document S does not block the second path MD2 of the leading end of the recording medium M as a predetermined operation for canceling the stop state before the leading end of the recording medium M discharged from the medium discharge port 58 is reached to the intersecting position CP.

Figure 14:
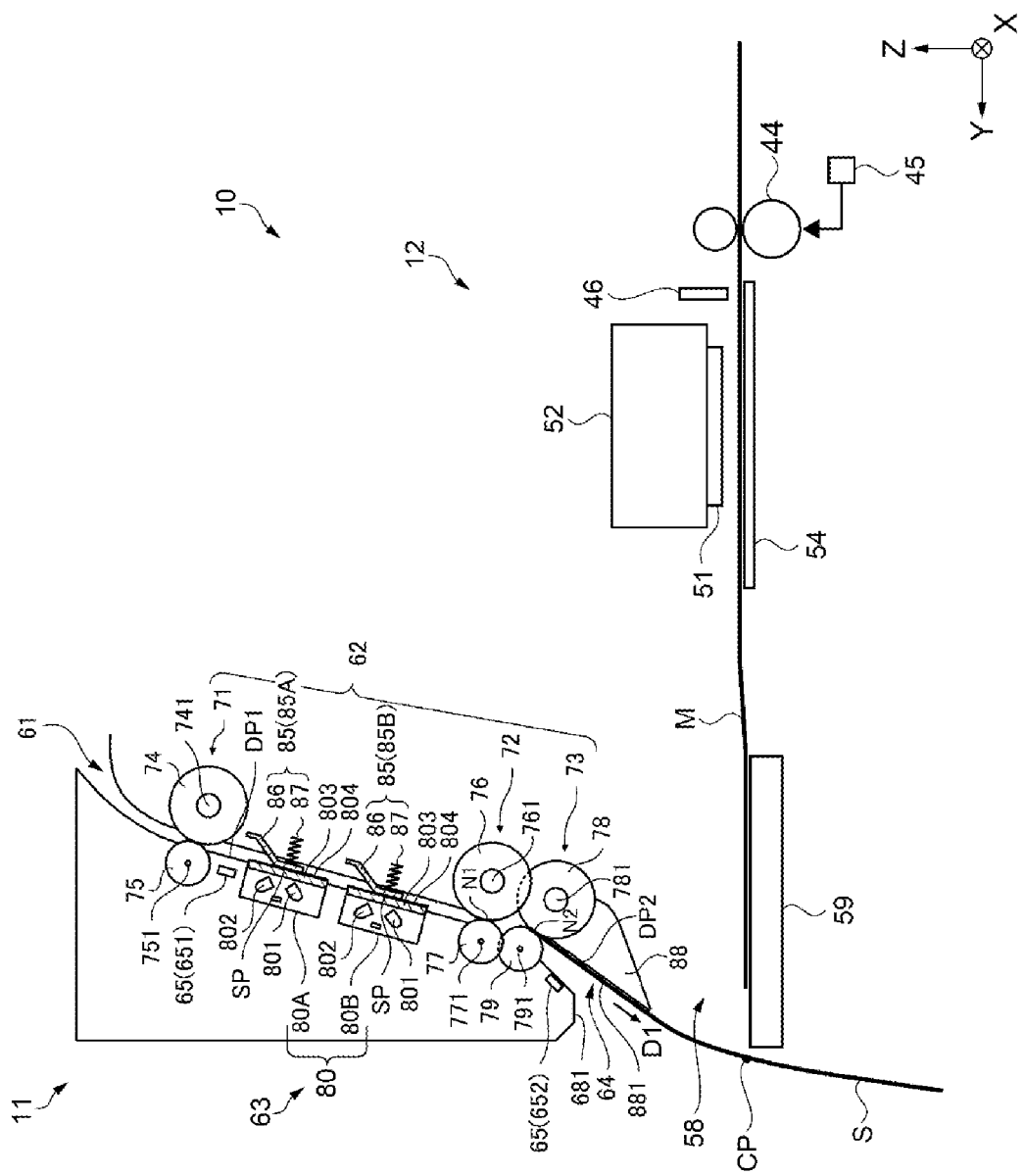
FIG. 14 is a schematic view illustrating the control method for the multifunction apparatus according to the second embodiment.
Figure 15:
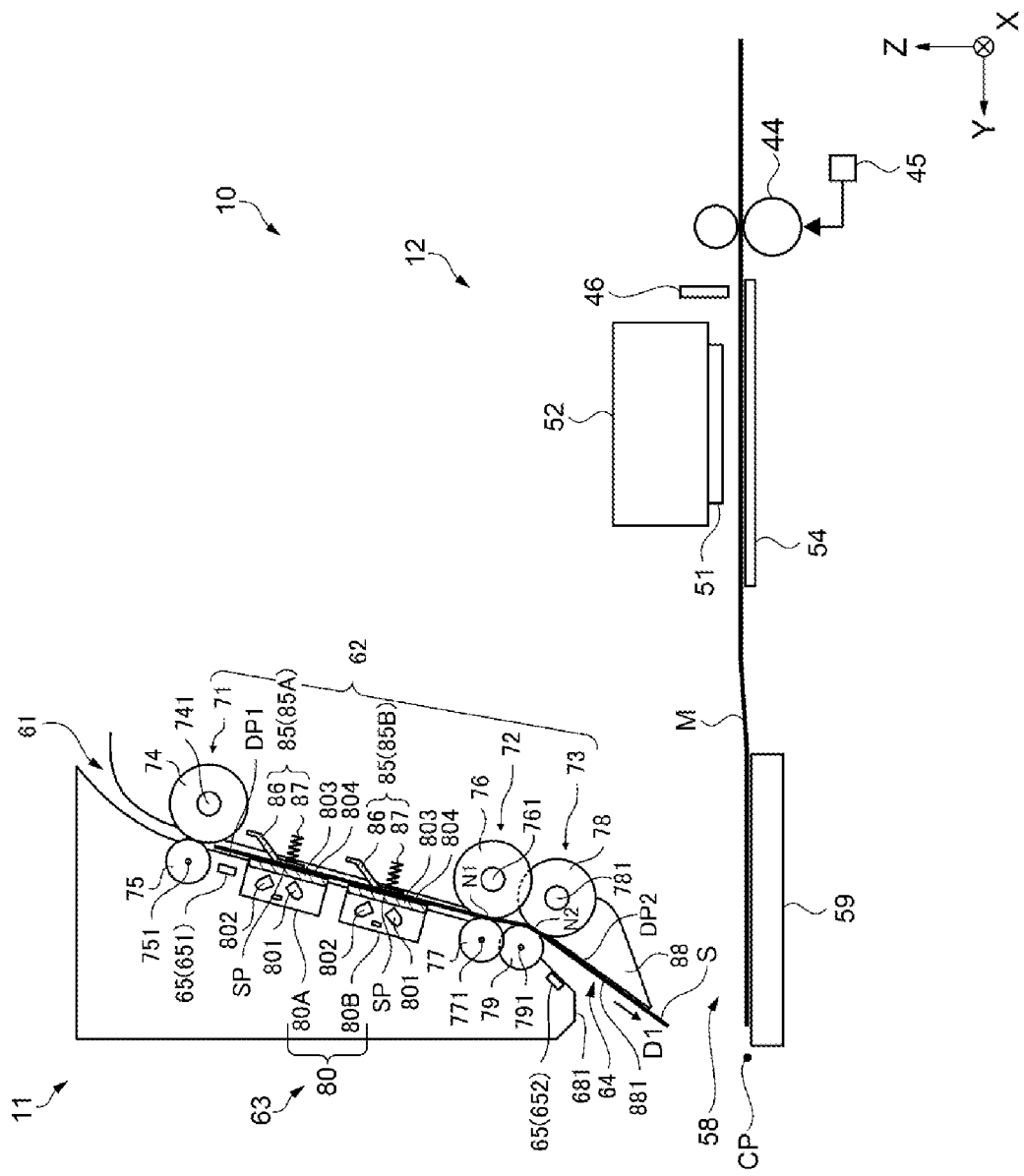
FIG. 15 is a schematic view illustrating the control method for the multifunction apparatus according to the second embodiment.
Figure 16:
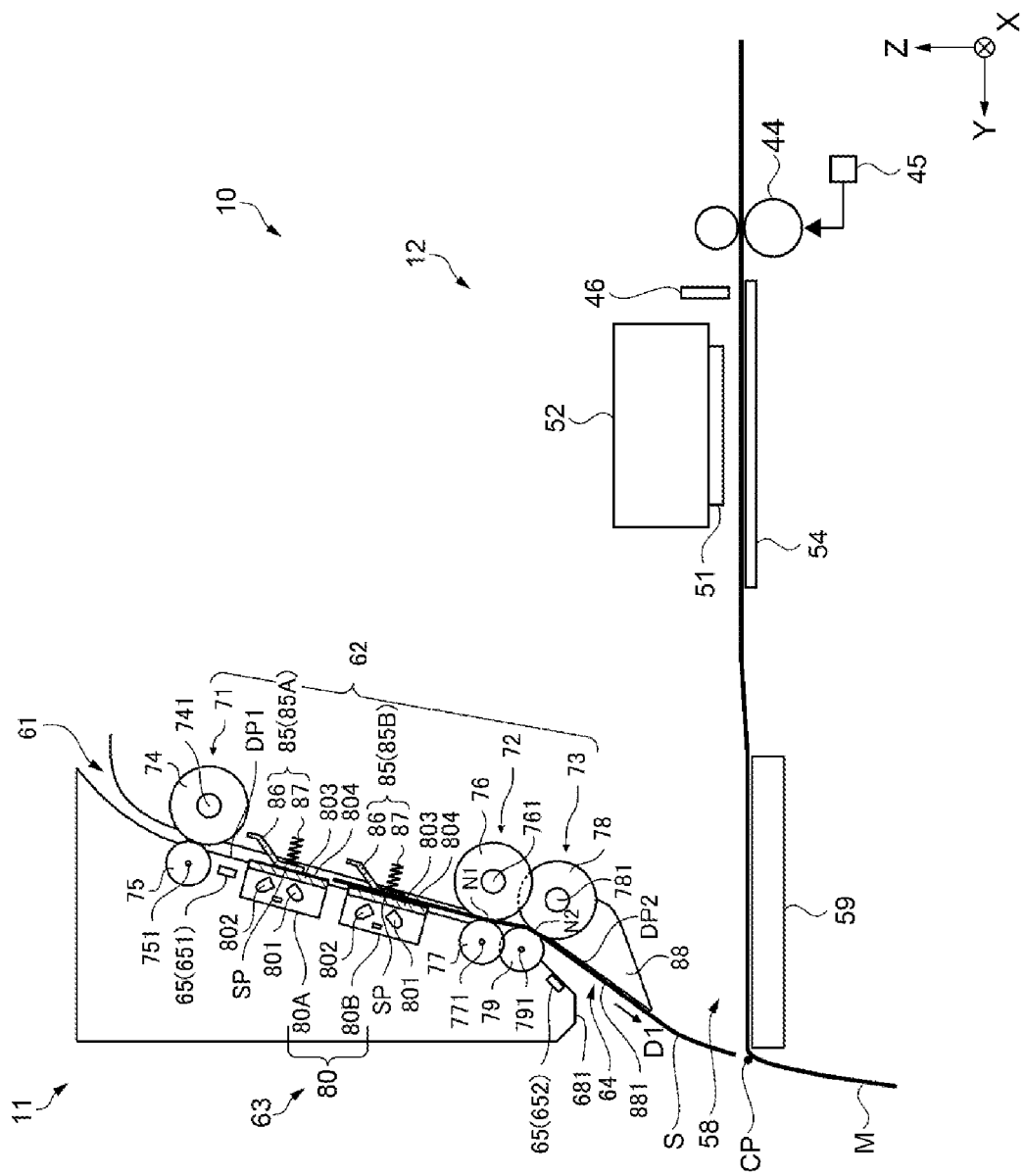
FIG. 16 is a schematic view illustrating the control method for the multifunction apparatus according to the second embodiment.

Specifically, as illustrated in FIG. 14, the transport motor 62M is driven in the stop state in which the discharging of the document S is stopped at the position where the document S blocks the second path MD2 of the leading end of the recording medium M. In the present embodiment, the transport motor 62M is reversely rotated and driven. Thus, as illustrated in FIG. 15, the upstream driving roller 74, the first driving roller 76, and the second driving roller 78 are reversely rotated, and the document S is transported in the direction opposite to the first discharge direction D1. For example, when the rear end of the document S reaches the first detection position DP1 that is the detection position by the first sensor 651, the control unit 100 stops driving of the transport motor 62M. This cancels the stop state and releases the medium discharge port 58. Then, as illustrated in FIG. 16, the recording operation is continuously performed, and the recording medium M is discharged from the medium discharge port 58. Note that the control unit 100 may be configured to detect a position of the leading end of the document S by detecting a motor rotation amount of the transport motor 62M, and to transport the document S in the direction opposite to the first discharge direction D1 up to a position where the leading end of the document S does not block the second path MD2 of the leading end of the recording medium M.

In step S209, the control unit 100 determines whether the leading end of the recording medium M has been discharged from the medium discharge port 58. In detail, the control unit 100 determines whether the leading end of the recording medium on which recording was performed M has been discharged to the outside from the medium discharge port 58. Specifically, the control unit 100 detects a position of the leading end of the recording medium M based on detection data by the medium position detector 45. Note that, since the position of the medium discharge port 58 is known, whether the leading end of the recording medium M is outside the medium discharge port 58 can be easily determined by detecting the position of the leading end of the recording medium M.

When the control unit 100 determines that the leading end of the recording medium on which recording was performed M has been discharged to the outside from the medium discharge port 58 (YES), in step S210, as illustrated in FIG. 16, the control unit 100 normally rotates and drives the transport motor 62M to discharge the document S along the first discharge direction D1. Note that in a case where the leading end of the recording medium M has already passed through the intersecting position CP, the leading end of the recording medium M is discharged along the second path MD2 even when the document S is discharged, and thus, the risk of the transporting jam is low.

As described above, according to the present embodiment, the document S is transported in the direction opposite to the first discharge direction D1 before the leading end of the recording medium M reaches the intersecting position CP, and thus, the second path MD2 of the recording medium M is not blocked. Due to this, the recording medium M can be smoothly discharged. Furthermore, since the document S does not fall down from the document discharge port 64, damage of the document S can be suppressed.

Note that the present embodiment and the first embodiment can be selected as appropriate by a user.

3. Third Embodiment

Next, a third embodiment will be described. Note that configurations identical to those in the first embodiment will be denoted by the same reference signs and redundant descriptions will be omitted.

Figure 17:
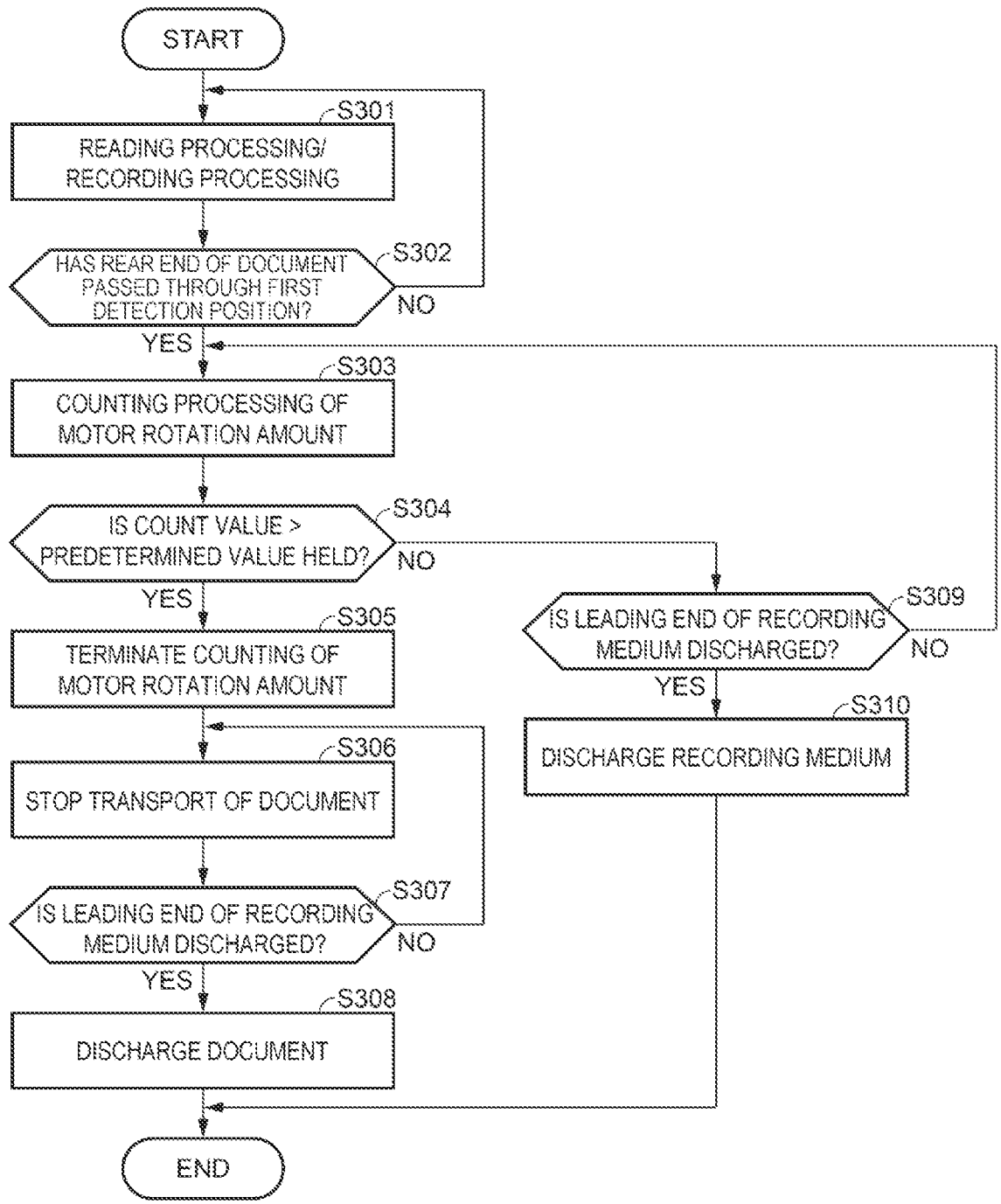
FIG. 17 is a flowchart illustrating a control method for a multifunction apparatus according to a third embodiment.

FIG. 17 illustrates a control method for the multifunction apparatus 10 according to the present embodiment. Note that the contents of steps S301 to S308 are similar to those of steps S101 to S108 (FIG. 9) of the first embodiment, so descriptions thereof will be omitted.

In the present embodiment, when the recording medium M is discharged from the medium discharge port 58 in a discharging state in which the document S is discharged, the control unit 100 discharges the recording medium M toward the intersecting position CP even in a state where the document S blocks the second path MD2 of the leading end of the recording medium M.

Details will be described below.

In step S304, the control unit 100 determines whether a count value by the counter has exceeded a predetermined value, and when the control unit 100 determines that the count value by the counter has exceeded the predetermined value (YES), the control unit 100 proceeds to step S305. On the other hand, when the control unit 100 determines that the count value by the counter has not exceeded the predetermined value (NO), the control unit 100 proceeds to step S309.

Figure 18:
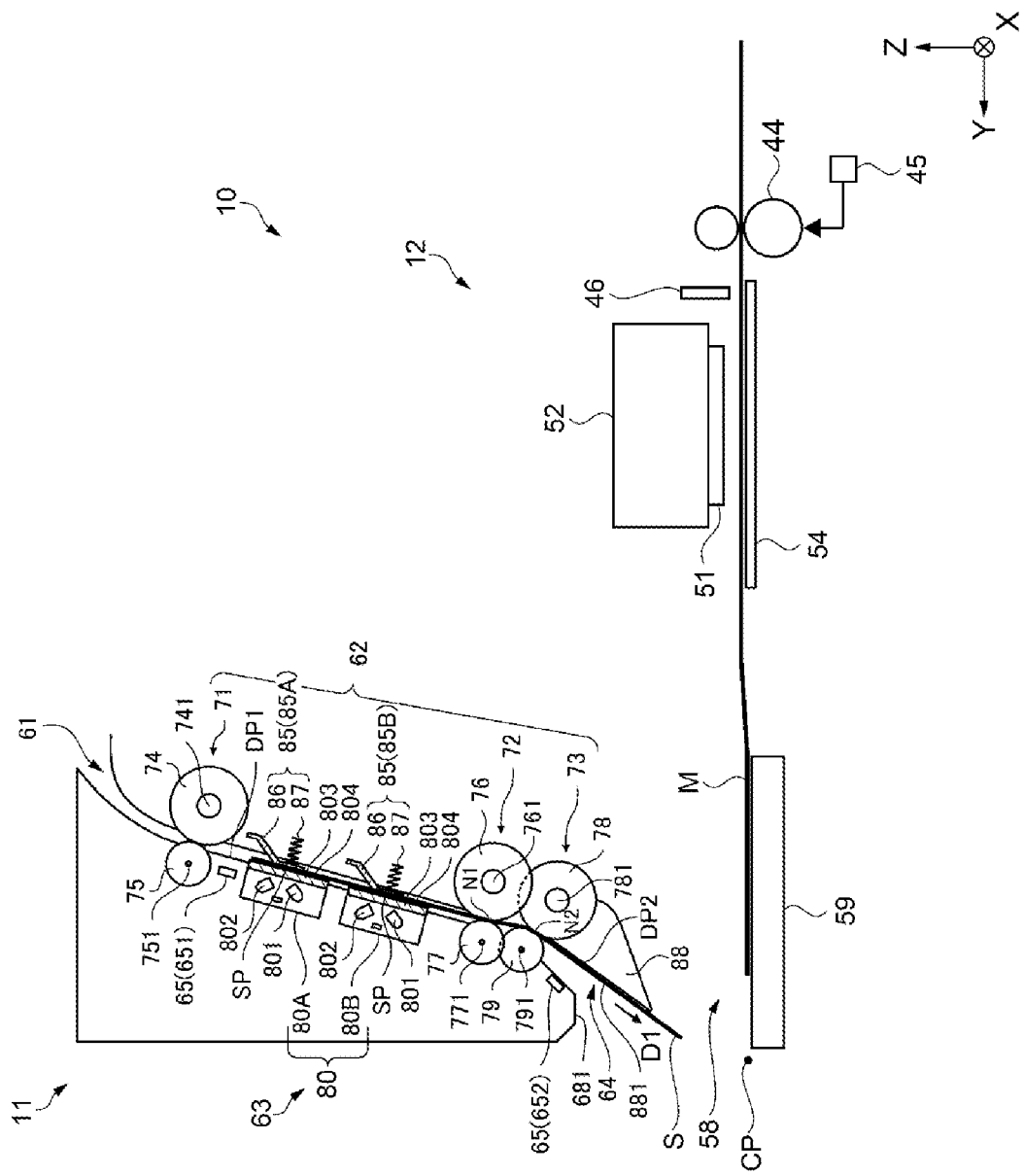
FIG. 18 is a schematic view illustrating the control method for the multifunction apparatus according to the third embodiment.

Here, the determination of the control unit 100 in step S304 is regarded as a determination of whether the rear end of the document S has passed through the pinching position N1. That is, as illustrated in FIG. 18, the case where the count value by the counter has not exceeded the predetermined value means a state where the rear end of the document S is at a position upstream from the pinching position N1 in the transport path FR, and the document S is being transported along the downstream of the transport path FR until the control unit 11 determines that the count value by the counter has exceeded the predetermined value. In other words, the document S is in the discharging state. Note that the discharging state may mean a state where the document S is being read, or may simply mean a state where the document S is being discharged.

In step S309, the control unit 100 determines whether the leading end of the recording medium M is discharged from the medium discharge port 58. In detail, the control unit 100 determines whether the leading end of the recording medium on which recording was performed M is near the medium discharge port 58. Specifically, the control unit 100 detects a position of the leading end of the recording medium M based on detection data by the medium position detector 45. Then, when the control unit 100 determines that the leading end of the recording medium M is near the medium discharge port 58 in the stop state of the document S (YES), the control unit 100 proceeds to step S310. On the other hand, when the control unit 100 determines that the leading end of the recording medium M is not near the medium discharge port 58 (NO), the control unit 100 proceeds to step S303.

In step S310, the control unit 100 continues to transport the recording medium M. In detail, the control unit 100 controls the recording mechanism 12 to perform the recording operation on the recording medium M and to transport the recording medium M.

Figure 19:
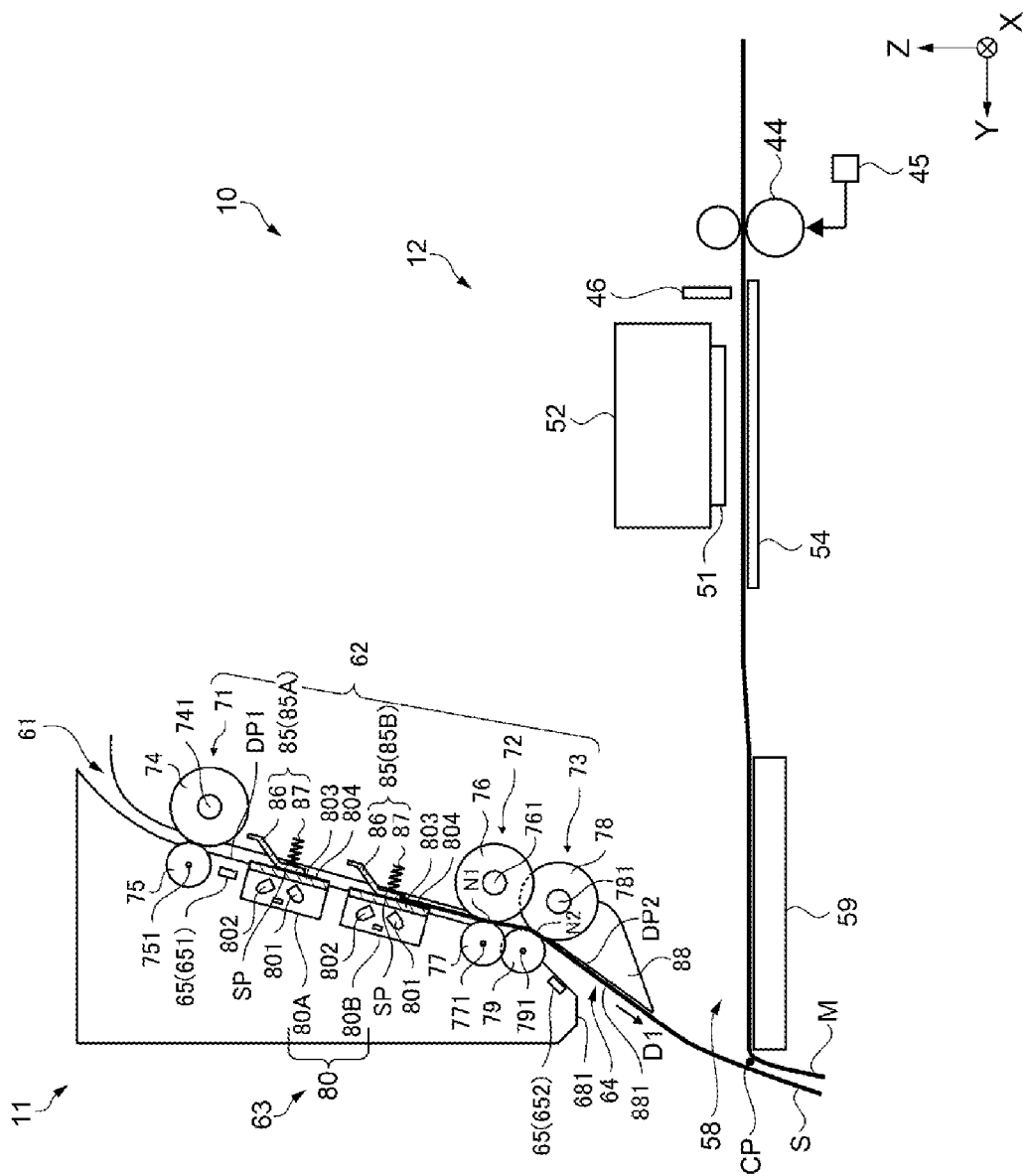
FIG. 19 is a schematic view illustrating the control method for the multifunction apparatus according to the third embodiment.

That is, as illustrated in FIG. 19, in step S310, the discharging of the document S and the discharging of the recording medium M are performed at the same time. In this case, due to the discharging of the document S, the document S passes through the intersecting position CP and occludes the medium discharge port 58, and in this state, the recording medium M comes into contact with the document S. However, since the recording medium M comes into contact with the document S discharged and moved downward along the first path MD1, the discharging of the recording medium M is promoted by a driving force associated with the downward movement of the document S, and the recording medium M is discharged downward together with the document S.

As described above, according to the present embodiment, the recording medium M is discharged along with the discharging operation of the document S after colliding with the document S. As a result, the transporting jam of the recording medium M can be reduced, and the discharging of the document S and the discharging of the recording medium M can be simultaneously performed, improving the throughput of the recording processing.

4. Fourth Embodiment

Next, a fourth embodiment will be described. Note that configurations identical to those in the first embodiment will be denoted by the same reference signs and redundant descriptions will be omitted.

Figure 20:
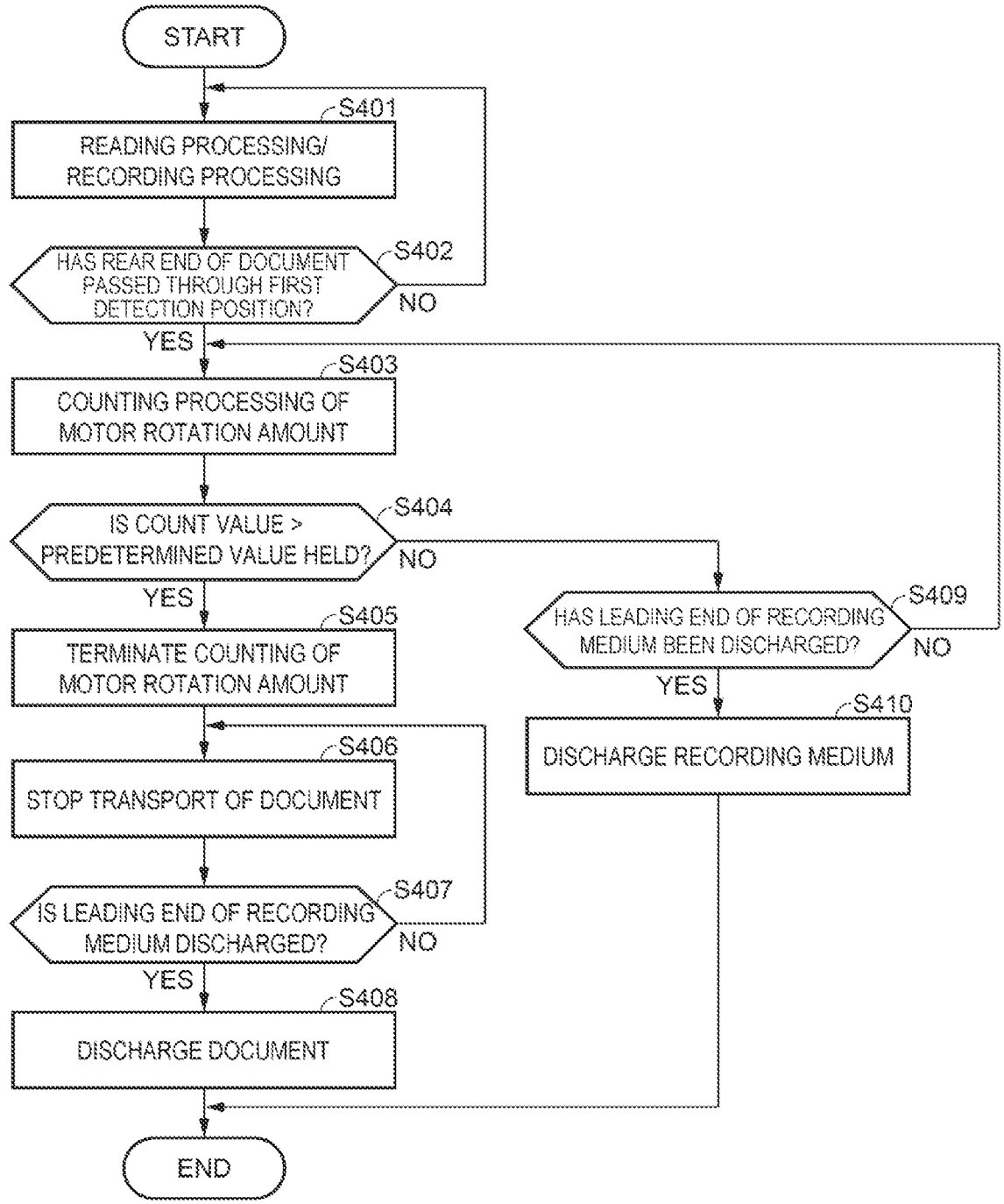
FIG. 20 is a flowchart illustrating a control method for a multifunction apparatus according to a fourth embodiment.

FIG. 20 illustrates a control method for the multifunction apparatus 10 according to the present embodiment. Note that the contents of step S401 to step S408 are similar to those of step S101 to step S108 (FIG. 9) of the first embodiment, and thus, descriptions thereof will be omitted.

In the present embodiment, when the leading end of the recording medium M passes through the intersecting position CP before the document S reaches the position where the document S occludes the medium discharge port 58, the control unit 100 performs the discharging of the document S and the discharging of the recording medium M at the same time.

Details will be described below.

In step S404, the control unit 100 determines whether a count value by the counter has exceeded a predetermined value, when the control unit 100 determines that the count value by the counter has exceeded the predetermined value (YES), the control unit 100 proceeds to step S405. On the other hand, when the count value by the counter has not exceeded the predetermined value (NO), the control unit 100 proceeds to step S409.

Figure 21:
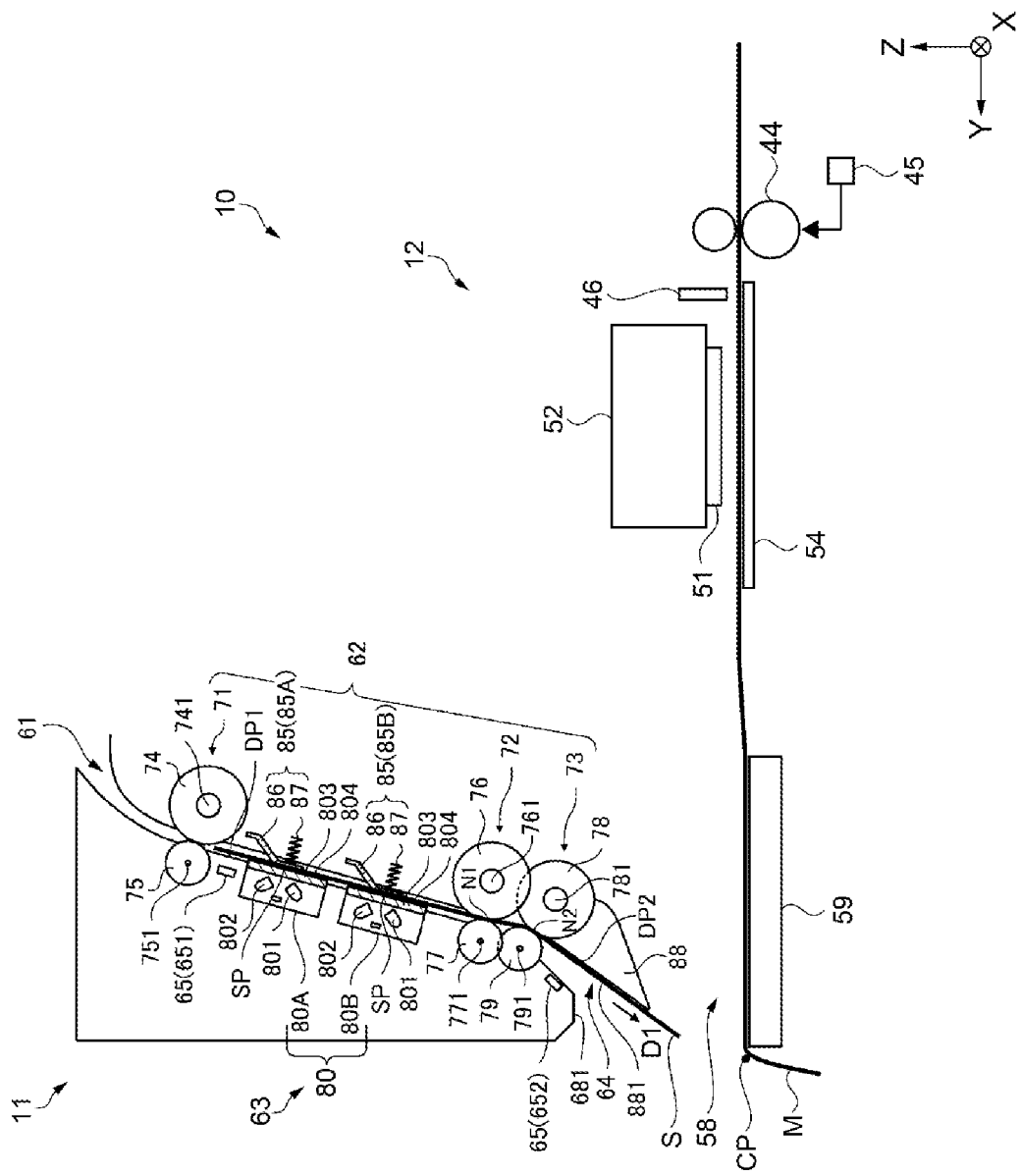
FIG. 21 is a schematic view illustrating the control method for the multifunction apparatus according to the fourth embodiment.

Here, the determination of the control unit 100 in step S404 is regarded as a determination of whether the rear end of the document S has passed through the pinching position N1. That is, as illustrated in FIG. 21, a case where the count value by the counter has not exceeded the predetermined value means a state where the rear end of the document S is at a position upstream from the pinching position N1 in the transport path FR, and the document S is being transported along the downstream of the transport path FR until the control unit 11 determines that the count value by the counter has exceeded the predetermined value. That is, the document S is in a state before reaching the position where the document S occludes the medium discharge port 58. Note that the state may mean a state where the document S is being read, or may simply mean a state where the document S is being discharged. Further, the state may mean a state where the document S may be stopped.

In step S409, the control unit 100 determines whether the leading end of the recording medium M is discharged from the medium discharge port 58. In detail, the control unit 100 determines whether the leading end of the recording medium on which recording was performed M has been discharged to the outside from the medium discharge port 58. Specifically, the control unit 100 detects a position of the leading end of the recording medium M based on detection data by the medium position detector 45. Then, when the control unit 100 determines that the leading end of the recording medium M has been discharged from the medium discharge port 58 (YES), the control unit 100 proceeds to step S410. On the other hand, when the control unit 100 determines that the leading end of the recording medium M has not discharged from the medium discharge port 58 (NO), the control unit 100 proceeds to step S403.

In step S410, the control unit 100 continues to transport the recording medium M. In detail, the control unit 100 controls the recording mechanism 12 to perform the recording operation on the recording medium M and to transport the recording medium M.

Figure 22:
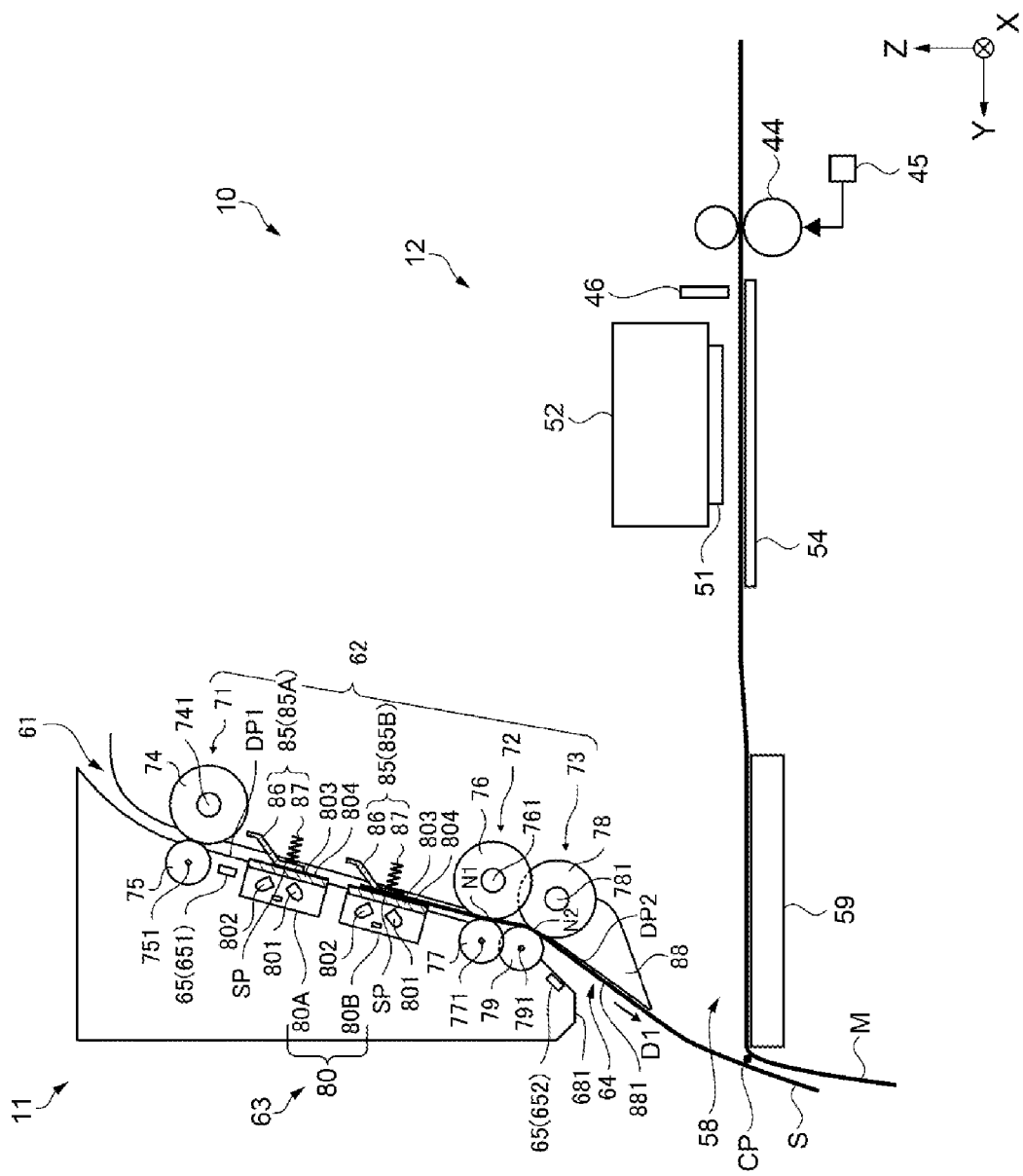
FIG. 22 is a schematic view illustrating the control method for the multifunction apparatus according to the fourth embodiment.

That is, as illustrated in FIG. 22, in step S410, the discharging of the document S and the discharging of the recording medium M are continued. In this case, due to the discharging of the document S, the document S passes through the intersecting position CP to occlude the medium discharge port 58, but the leading end of the recording medium M has already been discharged from the medium discharge port 58. Thus, since the leading end of the recording medium M does not collide with the document S, the recording medium M is discharged downward together with the document S.

As described above, according to the present embodiment, the leading end of the recording medium M does not collide with the document S, so the transporting jam of the recording medium M can be reduced, and the discharging of the document S and the discharging of the recording medium M can be simultaneously performed, improving the throughput of the recording processing.

5. Other Embodiments

When the document S is in the stop state at a position where the document S blocks the second path MD2 of the leading end of the recording medium M, the control unit 100 may cause the operation unit 15 to perform notification of the fact that the document S is to be removed from the reading mechanism 11 as the predetermined operation to cancel the stop state. As the notification means, for example, a warning display may be displayed on the display panel of the operation unit 15, or may generate a warning sound from the operation unit 15. This makes it possible to remove the document S in the stop state due to the notification by the operation unit 15 before the leading end of the recording medium M reaches the intersecting position CP, and the recording medium M can be smoothly discharged while the second path MD2 of the recording medium M is not blocked.

Further, for example, when the document S is clogged and stopped in the transport path FR, the control unit 100 may maintain the state in which the discharging of the document S from the document discharge port 64 is stopped, and may cause the operation unit 15 to perform notification of the fact that the document is clogged. In this way, damage to the document S can be prevented.

Further, for example, when the document S stops due to transportation failure or the like while the document S is being read in the transport path FR, the control unit 100 may resume the reading of the document S before the leading end of the recording medium M discharged from the medium discharge port 58 reaches the intersecting position CP. In this way, in a case where the reading is resumed and the document S does not stop, the risk of the transporting jam can be reduced even when the recording medium M collides with the document S. Note that in this case, prior to resuming the reading of the document S that has stopped, the control unit 100 transports the document S by a predetermined amount in the direction opposite to the first discharge direction D1, and then resumes the reading of the document S. This causes the reading of the document S to be reliably performed.

What is claimed is:
1. A multifunction apparatus comprising:
  a recording mechanism including a reading unit configured to read information of a document, and a document discharge port configured to discharge the read document;
  a recording mechanism including a recording unit configured to record the information on a recording medium, and a medium discharge port configured to discharge the recording medium on which recording was performed: and
  a control unit, wherein
  the document discharge port is disposed upward in a vertical direction of the medium discharge port, and a path through which a leading end of the recording medium discharged from the medium discharge port passes and the document discharged from the document discharge port have such a positional relationship to intersect with each other at an intersecting position, the reading of the document by the reading mechanism and the recording on the recording medium by the recording mechanism are simultaneously performed, and when the leading end of the recording medium is discharged from the medium discharge port in a stop state where the discharging of the document is stopped at a position where the document discharged from the document discharge port blocks the path of the leading end of the recording medium discharged from the medium discharge port, the control unit performs a predetermined operation for canceling the stop state before causing the leading end of the recording medium to reach the intersecting position.

2. The multifunction apparatus according to claim 1, further comprising:

a discharging roller configured to discharge the document at a position downstream from the reading unit in a transport direction of the document, wherein when the rear end of the read document is nipped by the discharging roller in the stop state, the control unit is configured to cause the discharging roller to discharge the document as the predetermined operation before causing the leading end of the recording medium to reach the intersecting position.

3. The multifunction apparatus according to claim 1, wherein the control unit is configured to transport the document in a direction opposite to a discharge direction up to a position where the document does not block the path of the leading end of the recording medium as the predetermined operation, before causing the leading end of the recording medium discharged from the medium discharge port to reach the intersecting position.

4. The multifunction apparatus according to claim 1, wherein when the recording medium is discharged from the medium discharge port in a discharging state where the document is discharged, the control unit is configured to discharge the recording medium toward the intersecting position even in a state where the document blocks the path of the leading end of the recording medium, as long as the document is in the discharge state.

5. The multifunction apparatus according to claim 1, wherein, when the leading end of the recording medium passes through the intersecting position before the document reaches a position where the document occludes the medium discharge port, the control unit continues the discharging of the document and the discharging of the recording medium.

6. The multifunction apparatus according to claim 1, wherein a first angle being an angle between a discharge direction of the document at the document discharge port and a horizontal direction is larger than a second angle being an angle between a discharge direction of the recording medium at the medium discharge port and the horizontal direction.

7. A control method for a multifunction apparatus, the multifunction apparatus including a reading mechanism including a reading unit configured to read information of a document, and a document discharge port configured to discharge the read document, a recording mechanism including a recording unit configured to record the information on a recording medium, and a medium discharge port configured to discharge the recording medium on which recording was performed, and a control unit, wherein the document discharge port is disposed upward in a vertical direction of the medium discharge port, and a path through which a leading end of the recording medium discharged from the medium discharge port passes and the document discharged from the document discharge port have such a positional relationship to intersect with each other at an intersecting position, and the reading of the document by the reading mechanism and the recording on the recording medium by the recording mechanism are configured to be simultaneously performed, the control method comprising:

when the leading end of the recording medium is discharged from the medium discharge port in a stop state where the discharging of the document is stopped at a position where the document discharged from the document discharge port blocks the path of the leading end of the recording medium discharged from the medium discharge port, performing a predetermined operation for canceling the stop state before causing the leading end of the recording medium to reach the intersecting position.

\* \* \* \* \*